US009880780B2

(12) United States Patent
Martineau et al.

(10) Patent No.: US 9,880,780 B2
(45) Date of Patent: Jan. 30, 2018

(54) ENHANCED MULTI-STREAM OPERATIONS

(71) Applicants: Jason Martineau, San Jose, CA (US);
Changho Choi, San Jose, CA (US)

(72) Inventors: Jason Martineau, San Jose, CA (US);
Changho Choi, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 3 days.

(21) Appl. No.: 15/046,439

(22) Filed: Feb. 17, 2016

(65) Prior Publication Data
US 2017/0153848 A1    Jun. 1, 2017

Related U.S. Application Data

(60) Provisional application No. 62/261,303, filed on Nov. 30, 2015.

(51) Int. Cl.
*G06F 3/06* (2006.01)
*G06F 12/02* (2006.01)

(52) U.S. Cl.
CPC .......... *G06F 3/0652* (2013.01); *G06F 3/064* (2013.01); *G06F 3/0608* (2013.01); *G06F 3/0619* (2013.01); *G06F 3/0679* (2013.01); *G06F 12/0246* (2013.01)

(58) Field of Classification Search
CPC .. G06F 3/0652; G06F 12/0246; G06F 12/023; G06F 12/0253; G06F 3/0616; G06F 3/064; G06F 3/0649; G06F 3/0679
See application file for complete search history.

(56) References Cited

U.S. PATENT DOCUMENTS

| 6,138,221 A | 10/2000 | Korst et al. |
| 7,254,668 B1 | 8/2007 | Chang et al. |
| 7,590,664 B2 | 9/2009 | Kamohara et al. |
| 7,660,264 B1 | 2/2010 | Eiriksson et al. |
| 7,852,854 B2 | 12/2010 | Monta et al. |
| 8,122,220 B1 | 2/2012 | Montierth et al. |

(Continued)

FOREIGN PATENT DOCUMENTS

WO    2013012901 A1    1/2013

OTHER PUBLICATIONS

Kang, Jeong-Uk et al., "The Multi-streamed Solid-State Drive," 6th USENIX Workshop on Hot Topics in Storage and File Systems (HotStorage 14), (URL:https://www.usenix.org/node/183609), May 7, 2014, 5 pages.

(Continued)

*Primary Examiner* — Hal Schnee
(74) *Attorney, Agent, or Firm* — Renaissance IP Law Group LLP

(57) ABSTRACT

A Solid State Drive (SSD) (505) may include circuitry to receive data from streams (305, 320, 335, 350). Each stream (305, 320, 335, 350) may have a Time-To-Live (TTL) (310, 325, 340, 355). Selection logic (525) may select a stream (305, 320, 335, 350) to write to a block (103). Writing logic (530) may then write data from the selected stream (905) to the block (103). The SSD (505) may change which stream (305, 320, 335, 350) is written to the block (103) over time. As a result, the data stored in the block (103) should expire sooner overall, making garbage collection of the block (103) more efficient.

21 Claims, 14 Drawing Sheets

(56) References Cited

U.S. PATENT DOCUMENTS

| | | |
|---|---|---|
| 8,144,515 B2 | 3/2012 | Moshayedi |
| 8,321,579 B2 | 11/2012 | Aggarwal et al. |
| 8,738,882 B2 * | 5/2014 | Post ................. G06F 12/02 |
| | | 711/101 |
| 9,003,066 B2 | 4/2015 | Taki et al. |
| 9,042,181 B2 | 5/2015 | Flynn et al. |
| 9,158,540 B1 | 10/2015 | Tzelnic et al. |
| 9,213,633 B2 | 12/2015 | Canepa et al. |
| 2002/0029313 A1 | 3/2002 | Funakoshi |
| 2004/0139042 A1 | 7/2004 | Schirmer et al. |
| 2005/0171965 A1 | 8/2005 | Fujimoto et al. |
| 2005/0172082 A1 | 8/2005 | Liu et al. |
| 2008/0126109 A1 * | 5/2008 | Cragun ............ G06Q 30/0603 |
| | | 709/223 |
| 2008/0235304 A1 | 9/2008 | Fujii et al. |
| 2009/0119352 A1 * | 5/2009 | Branda ............ G06F 12/0276 |
| 2010/0070448 A1 | 3/2010 | Omoigui |
| 2010/0161687 A1 * | 6/2010 | Altrichter ........ G06F 12/0253 |
| | | 707/813 |
| 2010/0235569 A1 | 9/2010 | Nishimoto et al. |
| 2011/0019482 A1 | 1/2011 | Buskirk et al. |
| 2011/0072189 A1 | 3/2011 | Post et al. |
| 2011/0096828 A1 | 4/2011 | Chen et al. |
| 2012/0072798 A1 | 3/2012 | Unesaki et al. |
| 2013/0159626 A1 | 6/2013 | Katz et al. |
| 2013/0166818 A1 | 6/2013 | Sela |
| 2013/0166824 A1 | 6/2013 | Shim et al. |
| 2013/0179624 A1 * | 7/2013 | Lambert ............ G06F 12/0246 |
| | | 711/103 |
| 2013/0290601 A1 | 10/2013 | Sablok et al. |
| 2014/0032817 A1 | 1/2014 | Bux et al. |
| 2014/0122774 A1 * | 5/2014 | Xian .................. G06F 12/0246 |
| | | 711/103 |
| 2014/0269090 A1 | 9/2014 | Flynn et al. |
| 2014/0281260 A1 | 9/2014 | Peterson et al. |
| 2014/0281302 A1 | 9/2014 | Horn |
| 2015/0293713 A1 * | 10/2015 | Seo .................... G06F 12/0246 |
| | | 711/103 |
| 2016/0092352 A1 * | 3/2016 | Camp ................ G06F 12/0253 |
| | | 711/103 |
| 2016/0162203 A1 * | 6/2016 | Grimsrud ............ G06F 3/0613 |
| | | 711/103 |
| 2016/0266792 A1 * | 9/2016 | Amaki ............... G06F 12/0246 |
| 2016/0283125 A1 | 9/2016 | Hashimoto et al. |
| 2016/0313943 A1 | 10/2016 | Hashimoto et al. |
| 2017/0017411 A1 * | 1/2017 | Choi .................. G06F 12/0246 |
| 2017/0075591 A1 | 3/2017 | Espeseth et al. |
| 2017/0131948 A1 | 5/2017 | Hoang et al. |

OTHER PUBLICATIONS

Ryu, Moonkyung et al., "FlashStream: A Multi-tiered Storage Architecture for Adaptive HTTP Streaming," ACM, Oct. 21-25, 2013, 10 pages.

* cited by examiner

ENHANCED MULTI-STREAM OPERATIONS

RELATED APPLICATION DATA

This application claims the benefit of U.S. Provisional Patent Application Ser. No. 62/261,303, filed Nov. 30, 2015, which is incorporated by reference herein for all purposes.

FIELD

This inventive concept relates to Solid State Drives (SSD), and more particularly to improving performing garbage collection on an SSD.

BACKGROUND

Today's storage devices incorporate many technologies. One important one is NAND Flash memory. Using Flash memory in storage devices such as Solid State Drives (SSDs) involves numerous design considerations. Such important considerations involve strategies for using storage capacity efficiently.

When previously stored data values are updated in Flash memory, the existing pages storing the data values are internally flagged as invalid, and the updated data values are stored in new pages. When data is deleted, the pages storing that data are similarly flagged as invalid. Invalid pages are eventually recovered in a process called garbage collection. But garbage collection operates at the block level—a block containing a number of pages. If garbage collection were to wait until a block was completely empty (i.e., all pages in the block were flagged as invalid), the SSD might eventually have no free pages to which data could be written. Therefore, performing garbage collection may require moving valid pages from blocks targeted for erasure to other blocks.

SSDs may write data to pages in the order in which the data arrives. This means that data from completely unrelated files—even data used by completely unrelated clients, if the SSD is used in a multi-client system—may be adjacent on the SSD. Since there is no latency associated with moving a read head around in an SSD (in contrast with traditional hard disk drives), an SSD's read and write access times are not affected by such a data writing strategy.

A need remains for a way to minimize the impact of garbage collection operations on other operations of an SSD.

DETAILED DESCRIPTION

Figure 1:
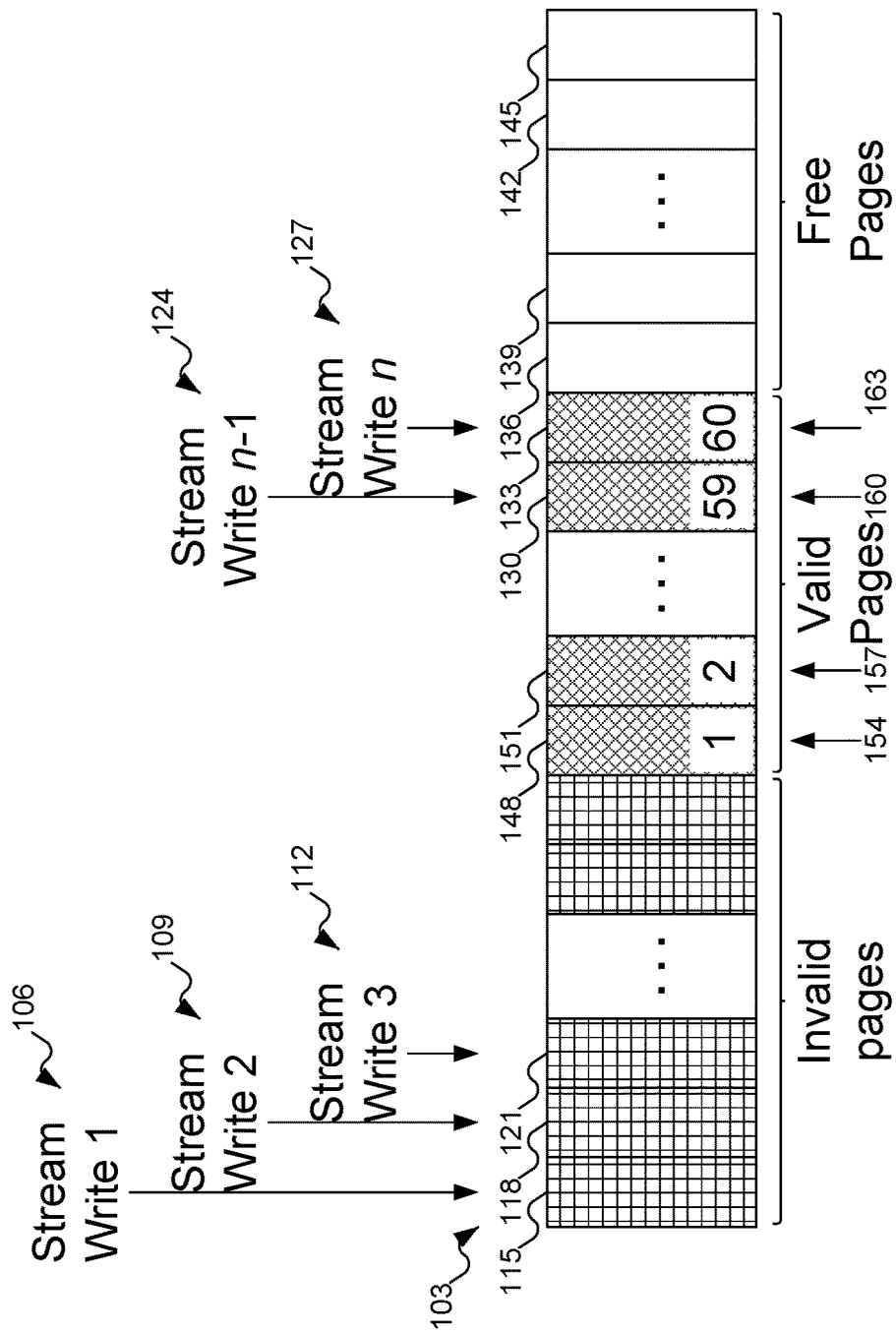
FIG. 1 shows a block receiving data associated with a stream with an associated Time-To-Live (TTL).

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

As described above, Solid State Drives (SSDs) write data to pages, which are in turn organized into blocks. When data is to be updated, the page storing the old data is copied into RAM, modified, then written to a free page on the SSD. The original page is then marked as invalid and the new page as valid.

As time passes, the number of invalid pages increases. Eventually, the SSD will have no more free pages unless the invalid pages are recovered by performing garbage collection. Garbage collection involves taking a target block (or super-block), copying all valid pages in that block into a new block, then erasing the original target block. This valid-data copying requires time and energy. In addition, because Flash memory may only sustain a limited number of writes, garbage collection negatively impacts the SSD lifespan.

Because Flash garbage collection significantly affects storage device performance, responsiveness, and lifespan, a variety of methods exist to help optimize garbage collection efficiency. One of them is referred to as Multi-stream, a technique that allows computing systems to attempt to classify data write activity.

Multi-streaming provides a method for an SSD to coalesce data write operations into streams. A data write operation is associated with one of a plurality of streams based on the expectation that all data associated with the stream has a similar Time-To-Live (TTL). This allows the storage device to place the data together in Flash media with the hope that the data collectively becomes invalid within a narrow and predictable timeframe. When successful, this placement strategy significantly reduces the operational intensiveness of garbage collection, since no valid data from the garbage-collected block needs to be saved elsewhere.

FIG. 1 shows a block receiving data associated with a stream with an associated TTL in a typical system. In FIG. 1, the storage device has serviced a plurality of write requests for one specific stream. In practice, the device would service the stream requests by first assigning, and thereafter dedicating, an available unused storage block to the stream and by then writing presented data values to the first available area (i.e., page(s)) within the block, starting at the lowest location address and progressing to higher location addresses. When full, another block is assigned, and dedicated, to the stream. When a block is later completely reclaimed by garbage collection, it returns to an Available-Block pool for subsequent assignment to another or the same stream.

In FIG. 1, some of the earliest-written data values have been deleted or updated, rendering their storage locations invalid. For example, block 103 has been dedicated to a stream. Stream writes 106, 109, 112 were written to pages 115, 118, and 121. Eventually, pages 115, 118, and 121 have all become invalid. Meanwhile, the most recent stream writes 124 and 127 have been written to pages 130 and 133, with other pages 136, 139, 142, and 145 remaining free. If a data value from one of pages 115, 118, or 121 was updated, the new, updated value could now reside at a higher address within the block, such as pages 148, 151, 130, and 133. Alternately, the new value might reside in another block subsequently assigned and dedicated to the stream.

In FIG. 1, valid pages 148, 151, 130, and 133 are shown with remaining TTL values 154, 157, 160, and 163. These values are not actually stored on the SSD, but rather represent the time until the data in the page is expected to expire. This value may be calculated as the difference between the TTL of data in the stream and how long the data has been resident on the SSD. For example, TTL values 154, 157, 160, and 163 indicate that the data in page 148 is expected to expire in one minute, the data in page 151 is expected to expire in two minutes, the data in page 130 is expected to expire in 59 minutes, and the data in page 133 is expected to expire in 60 minutes. This situation may occur, for example, if the stream has a TTL of 60 minutes, and data that occupies one page in block 103 arrives in the stream every minute.

If block 103 ended with page 133, then page 133, with TTL value 163, would be the last page with data to expire, requiring 60 minutes to expire. Thus, when the SSD is ready to perform garbage collection on block 103, the SSD would have to wait until the data in page 133 expires (60 minutes after when it was written), or the SSD will have to copy valid data from block 103 to another block to erase block 103.

In traditional multi-streaming storage, as shown in FIG. 1, a single block is associated with a single stream. The data being written to block 103 may have a predictable TTL. But because of the time required to fill the block, the pages in block 103 may invalidated in a "wave": that is, the pages in block 103 may expire sequentially over time. This may put the SSD in a "difficult" position: either the SSD must wait until all the data has expired, suffering a time penalty for an inability to utilize what would otherwise be "freeable space", or the SSD must copy some valid pages to another block to perform garbage collection on block 103, suffering the known garbage collection penalties.

FIG. 1 may also represent how the SSD fills blocks without multi-streaming storage. Where an SSD operates without multi-streaming storage, each page has an essentially random TTL, and it is not possible to predict when any data in block 103 will expire. Exchanging sequential TTL values 154, 157, 160, and 163 with random values, and by mixing the invalid and valid pages within block 103, FIG. 1 may reflect traditional non-multi-streaming storage.

But while traditional multi-streaming systems assign specific streams to storage blocks, storage blocks do not need to be assigned to specific streams. Instead, an overall lifetime may be assigned to a block, and data from streams of varying TTLs may be written to the block, with the aim that the data in the block should expire at a single, defined time. Using storage device intelligence and historical data, an SSD may determine whether it is more efficient to continue writing data from the current stream to the block, or to write data from a different stream to the remaining pages in the block. Of course, the same logic would also apply to the block's later-assigned stream. Specifically, the storage device might subsequently determine that it is more efficient to write data from a third stream rather than from the second stream to the block. Of course, data from the streams that have been switched away from the block may have their data written to other blocks.

Another solution is to use "second-order streams". The streams described above may be thought of as first-order streams: that is, each stream may contain data with similar TTL characteristics. But instead of writing data from first-order streams to blocks, data from first-order streams are written to second-order streams. The second-order stream may have its own TTL, and the data sent to the second-order stream is written to the blocks. Different first-order streams may provide data to the second-order stream, depending on how much time is left in the life of the second order stream. In such embodiments of the inventive concept, the association between the second-order stream and blocks on the SSD may be maintained, while still achieving a more consistent expiration of data within the block.

FIGS. 2A-2D show an example of the block of FIG. 1 receiving data associated with multiple streams with different TTLs, according to an embodiment of the inventive concept. FIGS. 2A-2D also illustrate the benefit of writing data from multiple streams to a single block. In FIGS. 2A-2D, assume that blocks on the SSD are 1 MB in size, and the SSD is receiving two streams. Stream 205 has an expected TTL of 60 minutes, writes an average of 24 KB of data at a time, and writes a file on average once every minute. Stream 210 has an expected TTL of 45 minutes, writes an average of 256 KB of data at a time, and writes a file on average once every five minutes.

FIG. 2A illustrates again the situation where all the data written to block 103 is associated with a single stream.

Given the average file size of 24 KB of data for stream 210, and the average write arrival rate of one file every minute, it will take roughly 45 minutes to fill the 1 MB capacity of block 103. Thus, after block 103 has been filled, the first data written to block 103 has remaining TTL value 215 of 15 minutes, while the last data written to block 103 has a remaining TTL value 220 of 60 minutes, and block 103 will have valid data for a total of one hour, 45 minutes (45 minutes until the last data is written, plus one hour for the data's TTL).

If the target block were forced into garbage collection any time before one hour after the last data was added to the block, then there would still be valid data in the block which would require transfer to another block during garbage collection. Furthermore, the earlier the SSD performs garbage collection on the block, the more valid data remains that must be relocated to another block on the SSD.

Figure 2A:
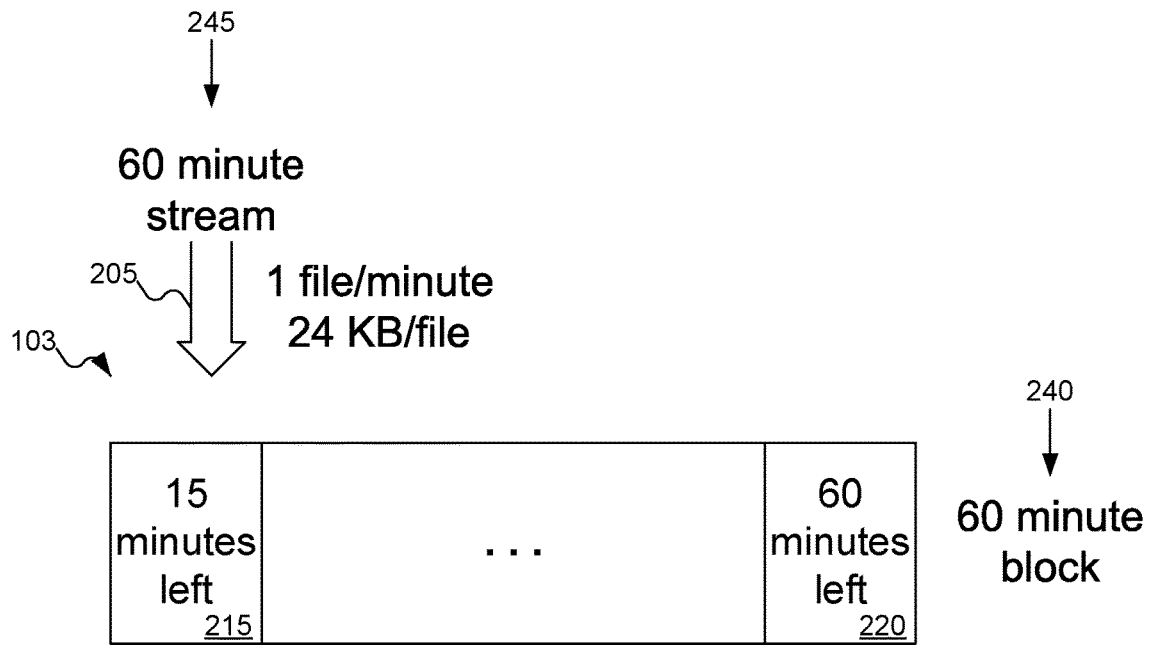
FIGS. 2A-2D show a first example of the block of FIG. 1 receiving data associated with multiple streams with different TTLs, according to an embodiment of the inventive concept.
Figure 2B:
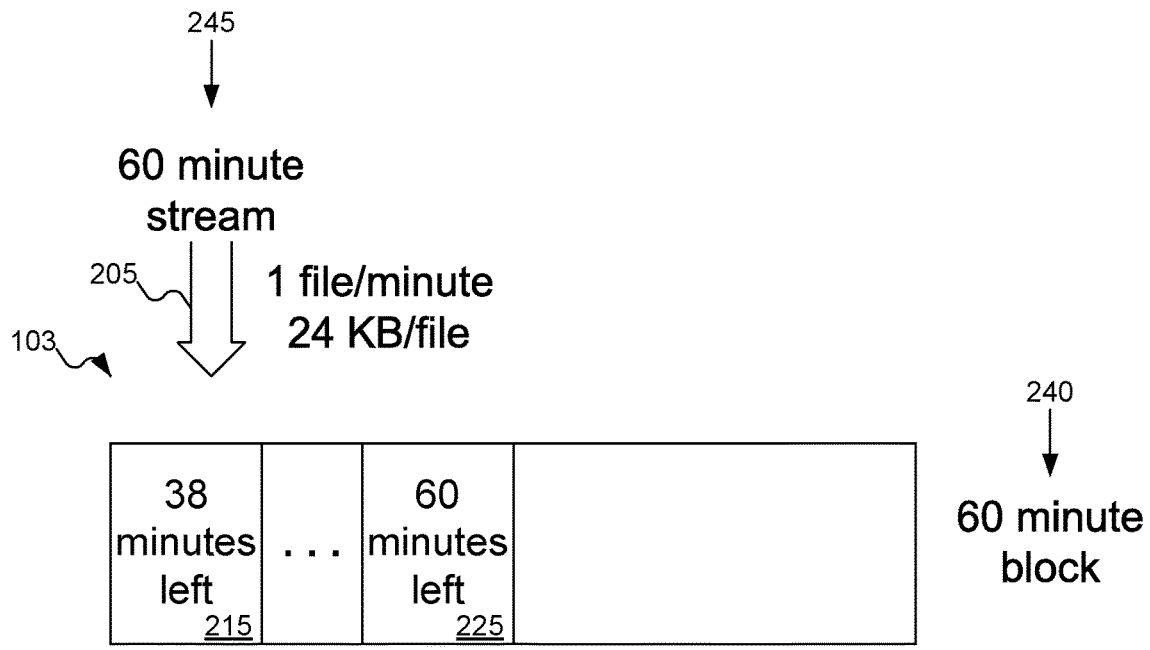

Instead, consider FIG. 2B, where stream 205 writes data to block 103 for only 22 minutes (at which point block 103 will be half-filled). At time 0:22, the first data written will have a remaining TTL value 215 of 38 minutes, and the last data written will have a remaining TTL value 225 of 60 minutes.

Figure 2C:
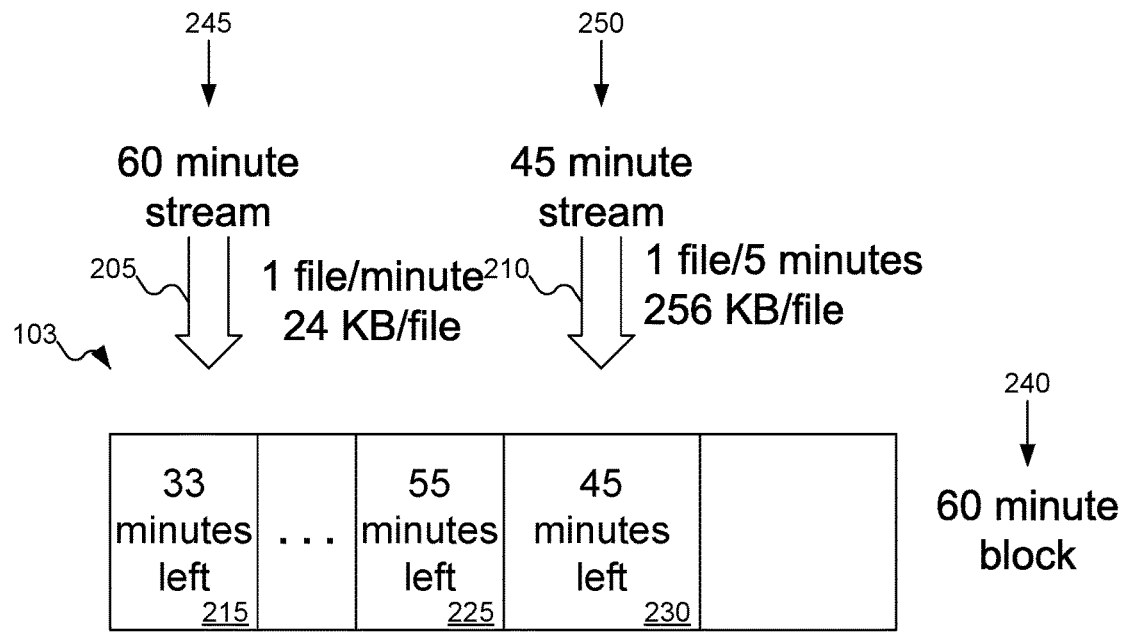

After time 0:22, block 103 switches to stream 210, as shown in FIG. 2C. At time 0:27, stream 210 writes data to block 103, adding data with TTL value 230 of 45 minutes. Note that TTL values 215 and 225 have also decreased by the five minutes waiting for stream 210 to write its first data.

Finally, at time 0:32, stream 210 writes a second file to block 103. Given the average write size and write arrival rate for stream 210, this second file completes block 103. At this point, the data written from stream 205 has remaining TTLs that vary from TTL value 215 of 28 minutes to TTL value 225 of 50 minutes, and the data written from stream 210 has TTL values 230 and 235 of 40 and 45 minutes, respectively. Since block 103 was completely filled at time 0:32, and the data with the longest remaining TTL (TTL value 225) is expected to expire in 50 minutes, block 103 may be subject to garbage collection at time 1:22, which is 23 minutes sooner than would occur in FIG. 2A. In addition, because more data is subject to expiry around the same time, block 103 would be a poor candidate for garbage collection before all the data expires.

Note that with even more streams, with a greater number of options for fill rate, TTL, and data size, the ability to switch streams to fill blocks in such a way that their pages "invalidate" all at once is enhanced. There can be any number of streams, each of which can have any TTL, average write size, and average write arrival rate.

FIGS. 3A-3D show a second example of how block 103 of FIG. 1 may receive data associated with multiple streams with different TTLs. In FIGS. 3A-3D, assume that there are only four streams, which have the same data fill rate and average write size, so that the primary difference between the streams is their TTL. The four streams described in FIGS. 3A-3D have, respectively, TTL values of 60, 45, 30, and 15 minutes.

Figure 3A:
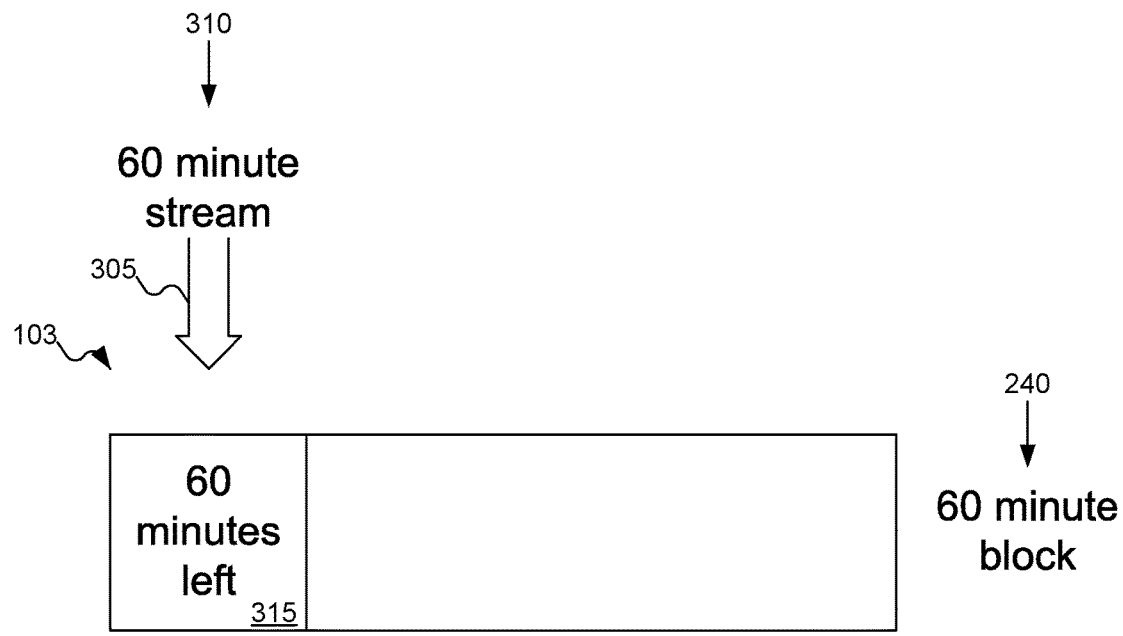
FIGS. 3A-3D show a second example of the block of FIG. 1 receiving data associated with multiple streams with different TTLs.
Figure 3B:
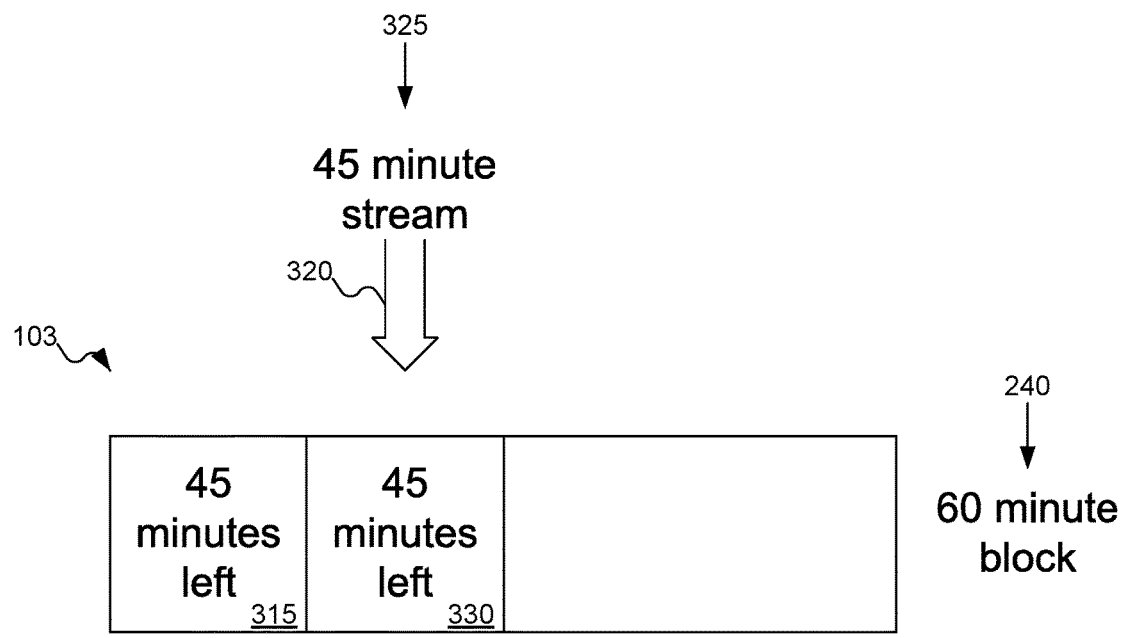

In FIG. 3A, stream 305 is writing to block 103, which has TTL 240 of 60 minutes. Stream 305 has TTL 310 of 60 minutes, and in 15 minutes time enough data is written to fill block 103 one quarter full with data with a longest remaining TTL 315 of 60 minutes. At this point, the SSD switches from stream 305 to stream 320, as shown in FIG. 3B. Stream 320 has TTL 325 of 45 minutes. Again, in 15 minutes enough data is written from stream 320 to fill another quarter of block 103. At this point, block 103 is half full, with data 315 and 330 expected to expire in 45 minutes.

Figure 3C:
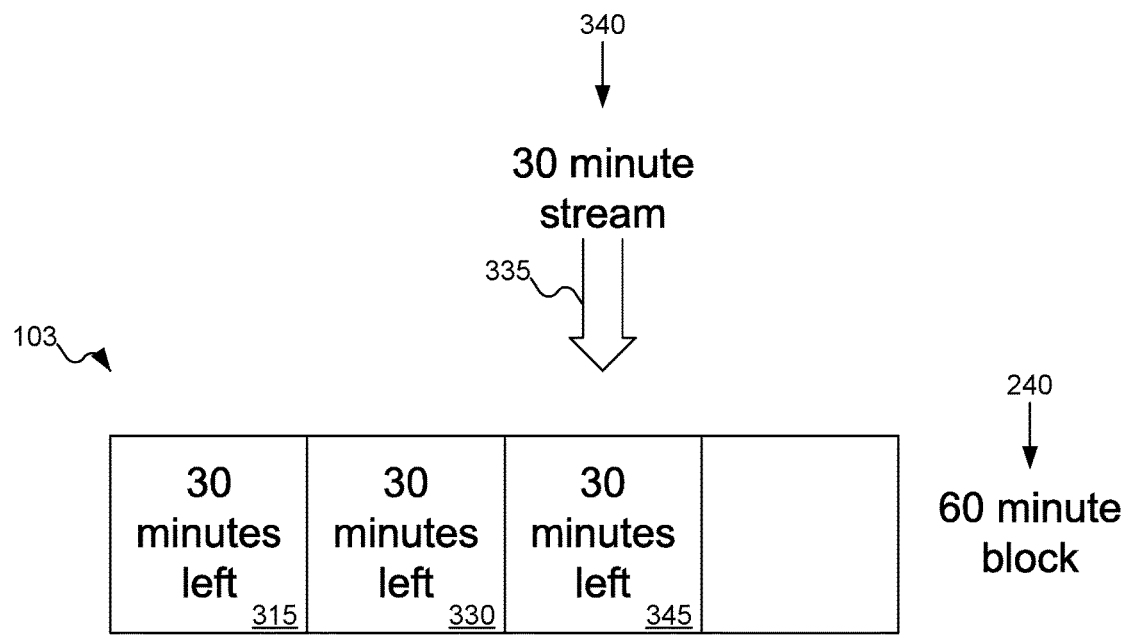
Figure 3D:
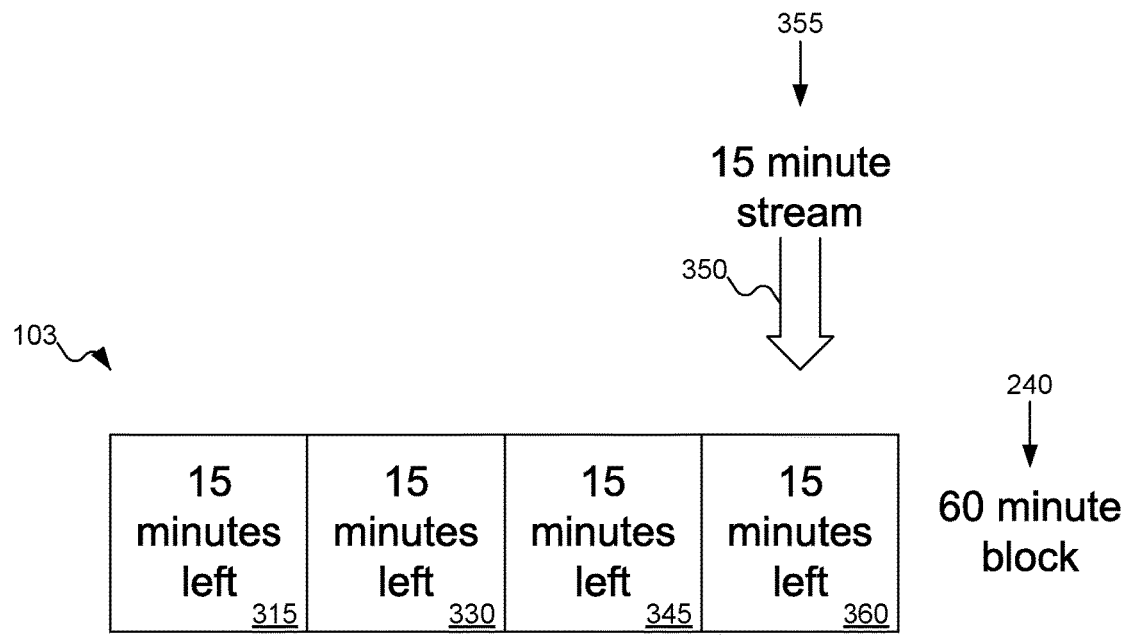

Now the SSD may switch to stream 335, as shown in FIG. 3C. Stream 335 has TTL 340 of 30 minutes. Again, in 15 minutes stream 335 may write enough data to fill another quarter of block 103, which is now three quarters full with data with remaining TTL 315, 330, and 345 of 30 minutes. At this point, the SSD may switch to stream 350, as shown in FIG. 3D. Stream 350 has TTL 355 of 15 minutes. After another 15 minutes, stream 350 has written enough data to completely fill block 103, and the data 315, 330, 345, and 360 in block 103 is expected to expire in 15 minutes. Thus, at time 1:15 after the first data from stream 305 of FIG. 3A is written to block 103, all the data in block 103 is expected to expire, and the entire block may be garbage collected.

Compared to the traditional system, the examples of FIGS. 2B-2D and FIGS. 3A-3D offer improved garbage collection performance. By using multi-streaming storage, the block is sequentially filled with data with decreasing TTL values. The data in blocks may expire more quickly overall, and more data may tend to expire around the same time. As a result, blocks are more likely to have all data expired when garbage collection is performed, obviating the need to copy any valid data to another block before performing garbage collection on the block. In addition, because more data tends to expire at the same time, the block is less likely to be selected for garbage collection before all the data in the block has expired.

Figure 2D:
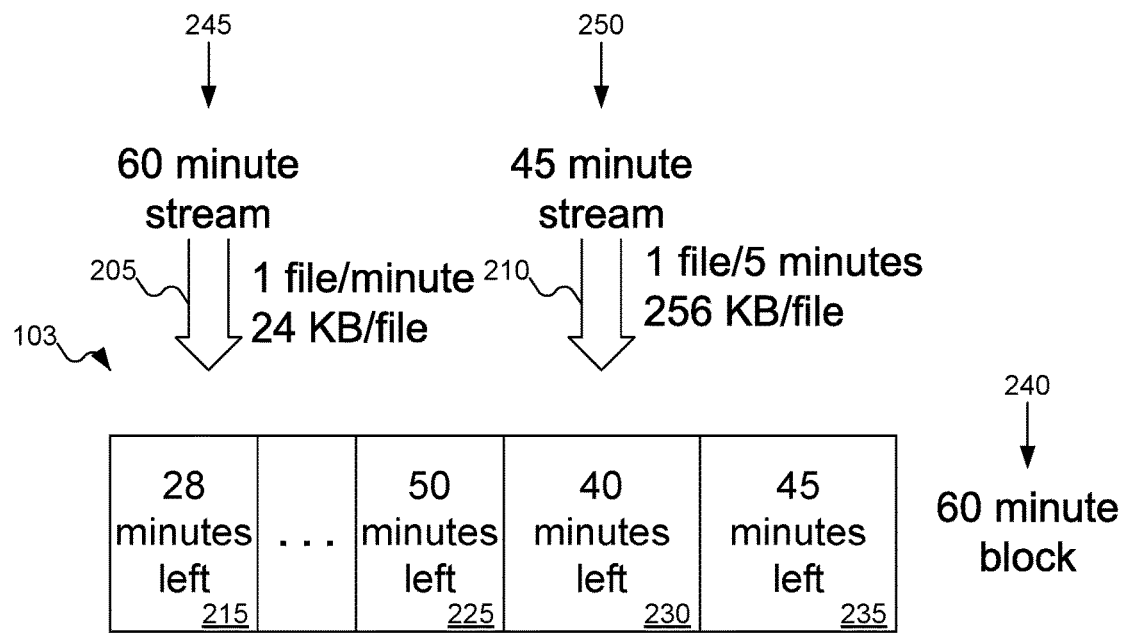

As may be seen by comparing FIGS. 2B-2D with FIGS. 3A-3D, when there are more streams from which to select, the time until all the data in the block expires may be less. For example, in FIGS. 2B-2D, all the data in the block is expected to expire at time 1:32; in FIGS. 3A-3D, all the data in the block is expected to expire at time 1:15. The data in the block is also more likely to have data expire at roughly the same time, making the block less likely to be selected for garbage collection while the block still contains valid data.

In FIGS. 2A-2D, two streams are described and used to write data to block 103. In FIGS. 3A-3D, four streams are described and used to write data to block 103. But while these examples show all of the streams being used to write data to block 103, other embodiments of the inventive concept may use only a subset of the available streams. For example, in FIGS. 2A-3D, there might be 20 streams being written to the SSD, but only a few of those streams are written to block 103. And the various streams can have different TTLs, write sizes, and write arrival rates, without limitation.

There is a lower limit on how early a block would be ready for optimal garbage collection. Each page written to block 103 has its own TTL, depending on the stream from which it originated. In the worst case, a block might have valid data for as long as it takes to fill the block plus the maximum TTL for any data written to the block. More accurately, block 103 will contain some valid data up to $$\max_{pages}(time\ written(page) + TTL(page)).$$

Note that it may happen that an earlier-written page might have a longer TTL, and the expiration time for that page might be later than the expiration time for a later-written page with a shorter TTL. But frequently, the expiration time for all data in the block will be the expiration time for the last data written to the block. Thus, if it takes one hour to completely fill the block, and the last data written has a 15 minute TTL, then all the data in the block may be expected to expire at around time 1:15.

Figure 4:
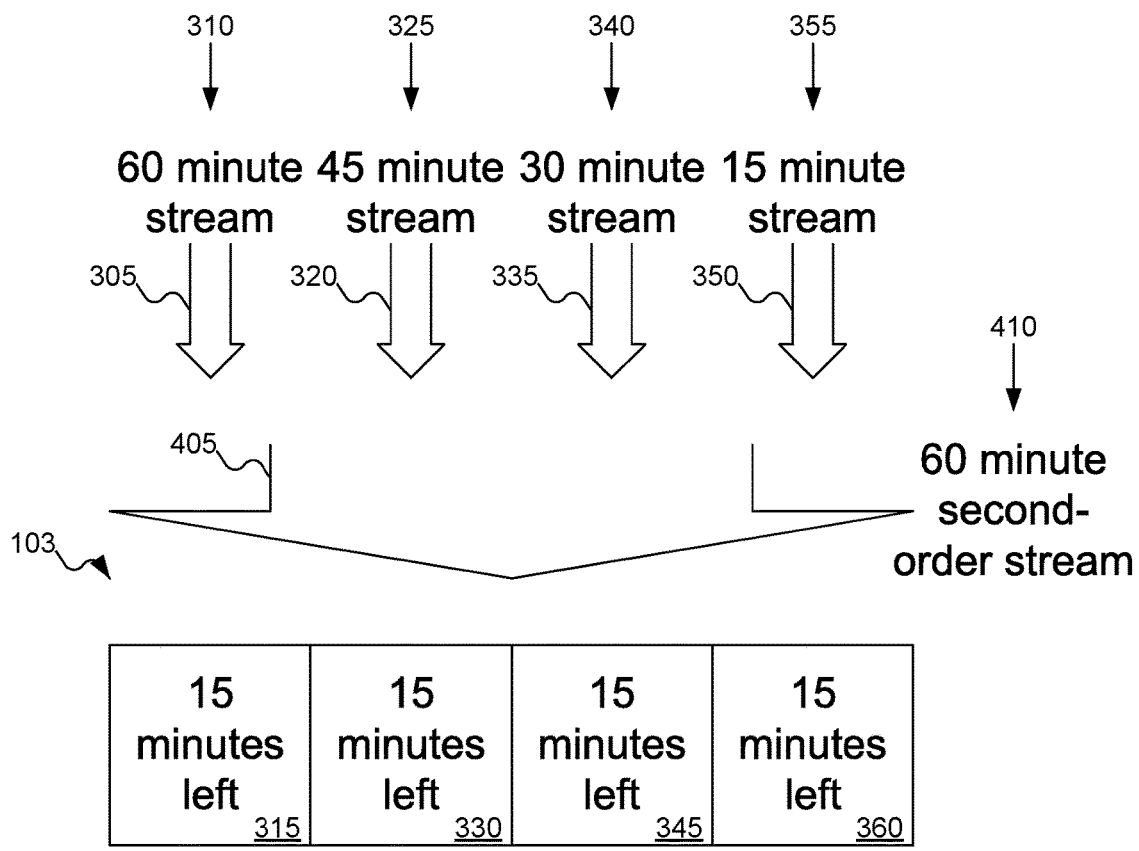
FIG. 4 shows the block of FIG. 1 receiving data associated with a second-order stream with a TTL, according to an embodiment of the inventive concept.

In other embodiments of the inventive concept, all first-order streams would be analyzed as was shown in above. But instead of writing directly to blocks, the first-order streams would write to time-limited second-order streams based on the time remaining in those streams. FIG. 4 illustrates an example of a second-order stream.

As a simple case, assume the same first-order streams shown in FIGS. 3A-3D:
Stream 305, with TTL 310 of 1 hour.
Stream 320, with TTL 325 of 45 minutes.
Stream 335, with TTL 340 of 30 minutes.
Stream 350, with TTL 355 of 15 minutes.
Also assume a single second-order stream 405, with TTL 410 of 1 hour.

When second-order stream 405 is created, it is first assigned data from Stream 305. As second-order stream 405 ages and its lifespan approaches 45 minutes, it stops receiving data from stream 305 and starts receiving data from stream 320. Likewise, as the lifespan of second-order stream 405 approaches 30 minutes, it receives data from stream 335, and later when only 15 minutes remain, from stream 350.

Under this approach, block 103 assigned to second-order stream 405 would have all data invalidate within about 15 minutes of each other (note that this is the granularity of the first-order streams), and the maximum lifespan of the whole block would be about 1:15. Note that in this example, the behavior is similar to the embodiment shown in FIGS. 3A-3D, but this need not be the case. In instances where data fill rates are high compared to the lifespan of the data or the remaining size of the block, a second order stream embodiment can provide more flexibility. If a second order stream fills a block before it expires, it can be moved to a new block (with its remaining TTL); meanwhile, the old block will still have all of its data expire at approximately the same time (within the granularity of the first order streams). In other words, with a second order stream mechanism, there is no strain on the system to find low-lifespan or fast-fill rate streams to fill a block nearing the end of its life. Note also that any block unfilled by an expiring second-order stream may be filled by a new stream having a lifespan similar to the remaining TTL of the data already stored in the block.

Note that with either solution, with more first-order streams, smaller time granularities may be obtained (meaning that the pages would have a tendency to invalidate within closer times of one another).

As with the first order embodiments presented earlier, many second-order streams may operate simultaneously. Different second-order streams may be created with different lifespans, depending on the attributes of the first-order streams.

In either solution, when the SSD decides to switch to a different stream (be it a different first-order stream writing to the block or a different first-order stream assigned to a second-order stream), the SSD may use any desired algorithm for selecting the new stream. One algorithm for selecting a new first-order stream is to select the stream with the smallest TTL greater than the remaining TTL for the block or second-order stream (or the largest TTL, if no stream has a TTL greater than the remaining TTL for the block or second-order stream). Thus, returning to FIG. 3A, since block 103 has TTL 240 of 60 minutes, stream 305, with TTL 310 of 60 minutes, is the best choice. When TTL 240 drops to 45 minutes in FIG. 3B, stream 320, with TTL 325 of 45 minutes, becomes the best choice using this algorithm. Then, when TTL 240 drops to 30 minutes in FIG. 3C, stream 335, with TTL 340 of 30 minutes, becomes the best choice using this algorithm, and so on. The same selection strategy may be applied when selecting a first-order stream to associate with second-order stream 405 of FIG. 4.

As an alternative, the SSD may select a first-order stream that has a TTL closest to the remaining TTL for the block. Thus, returning to FIG. 3A, stream 305, with TTL 310 of 60 minutes, is closest to block TTL 240 of 60 minutes, and remains the stream to use until time 0:07.5. After that time, stream 320, with TTL 325 of 45 minutes, is closest to remaining block TTL 240 of 52½ minutes, and remains so until time 0:22.5. At time 0:22.5, stream 335, with TTL 340 of 30 minutes, is closest to remaining block TTL 240 of 37½ minutes, and so on.

Figure 5:
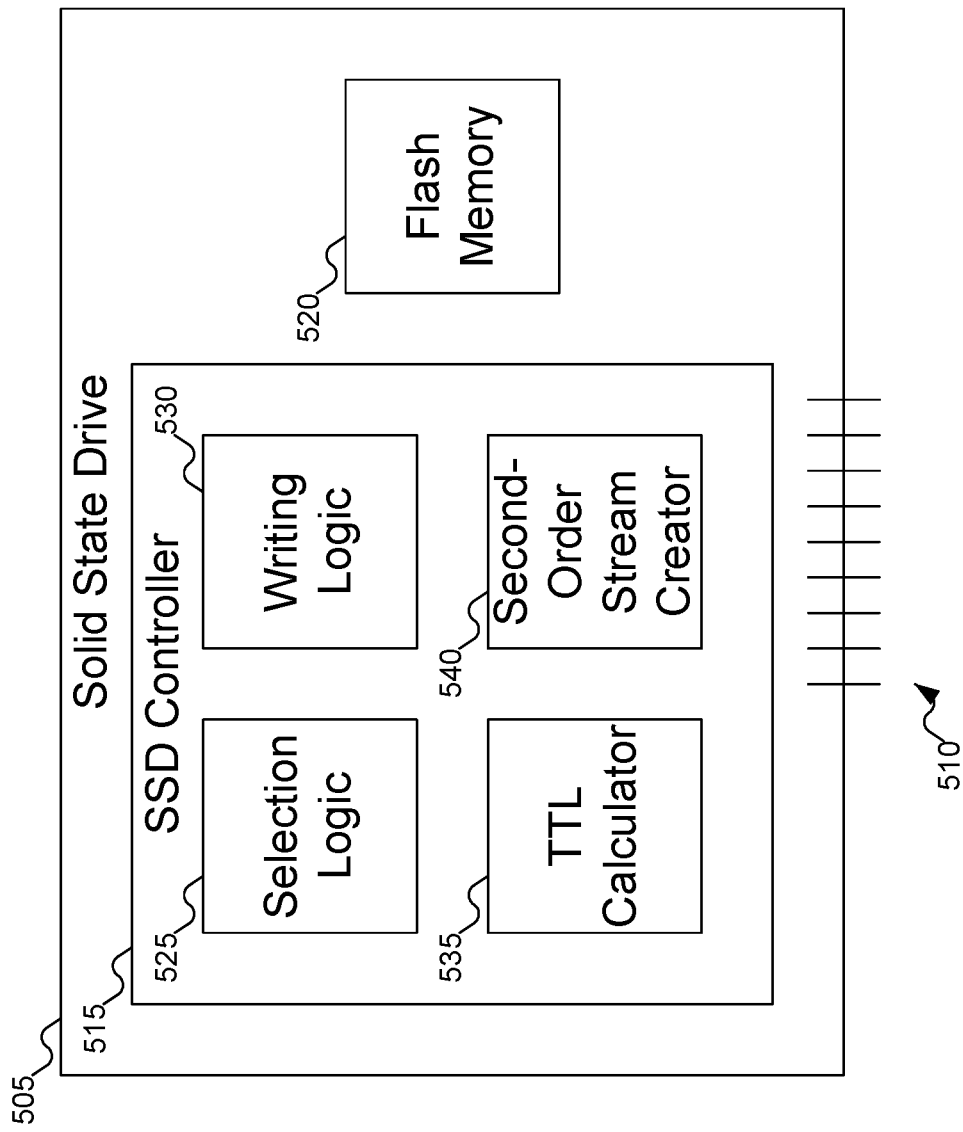
FIG. 5 shows a Solid State Drive (SSD) to write data from different streams to the block of FIG. 1, according to embodiments of the inventive concept.

FIG. 5 shows a Solid State Drive (SSD) to write data from different streams to the block of FIG. 1, according to embodiments of the inventive concept. In FIG. 5, SSD 505 is shown. SSD 505 may include circuitry 510 that may be used to send and receive information (such as operations or data). SSD 505 may also include SSD controller 515 and flash memory 520. SSD controller 515 may control the operation of SSD 505. Flash memory 520 may store data (that is, flash memory 520 may store block 103 of FIG. 1, among other blocks).

SSD controller 515 may include, among other components, selection logic 525, writing logic 530, and TTL calculator 535. Selection logic 525 may select a stream to be used, either for writing to block 103 of FIG. 1 or assigning to second-order stream 405 of FIG. 4 (if second-order stream 405 of FIG. 4 is used). Writing logic 530 may write data to flash memory 520 (possibly under the command of second-order stream 405 of FIG. 4). More specifically, writing logic 530 may write data to a page in flash memory 520, such as a page in block 103 of FIG. 1. TTL calculator 535 may calculate a TTL, for either a stream (such as TTLs 245 and 250 of FIGS. 2A-2D, TTLs 310, 325, 340, and 355 of FIGS. 3A-3D, TTL. 410 of FIG. 4) or a block (such as block TTL 240 of FIGS. 2A-3D).

In embodiments of the inventive concept using second-order streams, SSD controller 515 may also include second-order stream creator 540. Second-order stream creator 540 may create second-order stream 405 of FIG. 4, which may be associated with block 103 of FIG. 4.

Figure 6:
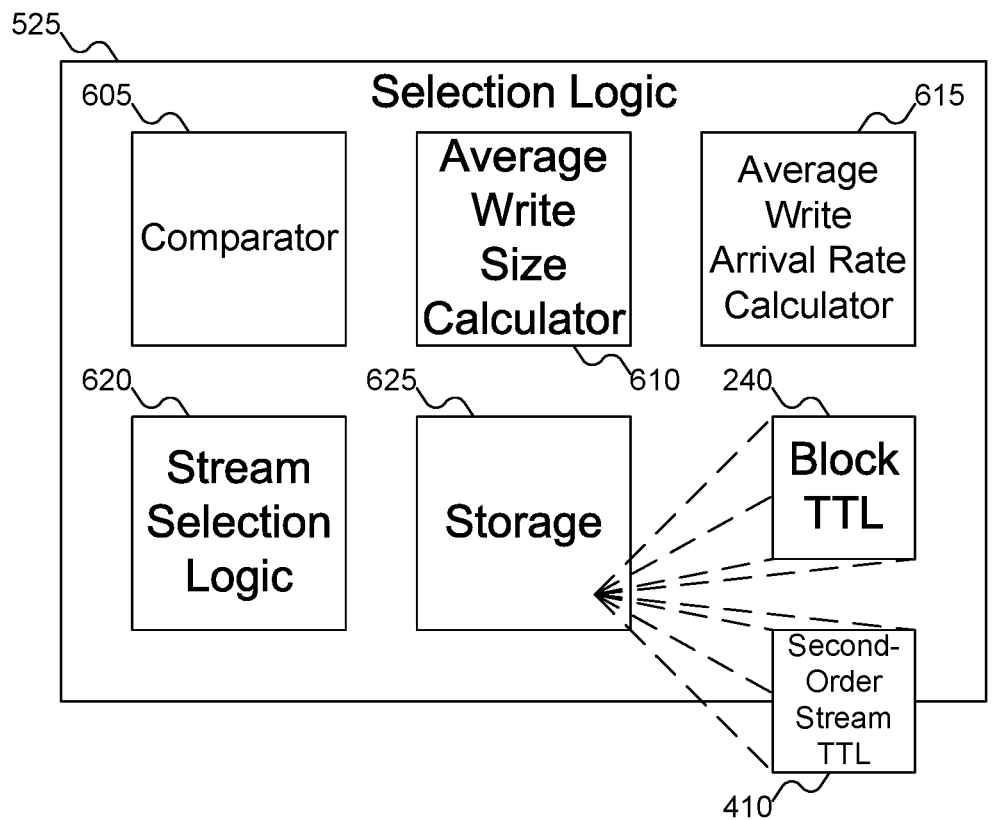
FIG. 6 shows details of the selection logic of FIG. 5.

FIG. 6 shows details of selection logic 525 of FIG. 5. In FIG. 6, selection logic 525 may include comparator 605, average write size calculator 610, average write arrival rate calculator 615, stream selection logic 620, and storage 625. Storage 625 may store block TTL 240 and/or second-order stream TTL 410 (although block TTL 240 and second-order stream TTL 410 may be stored externally to selection logic 525). Comparator 605 may compare TTLs 245 and 250 of FIGS. 2A-2D (for streams 205 and 210 of FIGS. 2A-2D) and TTLs 310, 325, 340, and 355 of FIGS. 3A-3D (for streams 305, 320, 335, and 350 of FIGS. 3A-3D) with either block TTL 240 or second-order stream TTL 410, depending on the embodiment of the inventive concept. Based on this comparison, stream selection logic 620 may select what stream should write to block 103 of FIG. 1 or be assigned to second-order stream 405 of FIG. 4, depending on the embodiment of the inventive concept.

Selection logic 525 may operate at any desired time. For example, selection logic 525 may be used on a periodic basis, such as every 5 minutes. Or, selection logic 525 may be used whenever a new write operation is sent to SSD 505 of FIG. 5. Or, selection logic 525 may be used whenever block TTL 240 or second-order stream TTL 410 becomes lower than TTL 245 or 250 of FIGS. 2A-2D or TTLs 310, 325, 340, or 355 of FIGS. 3A-3D of the stream currently writing to block 103 of FIG. 1 or second-order stream 405 of FIG. 4. Selection logic 525 may also factor in other information, such as the average write size and average write arrival rate of each stream, in selecting a stream. For example, consider again block 103 of FIGS. 2A-3D with TTL 240 of FIGS. 2A-3D of 60 minutes, and assume that block 103 of FIGS. 2A-3D includes 60 pages. A stream that writes one page per minute with a TTL of 60 minutes would mean that block 103 would contain valid data for 120 minutes (60 minutes until the last page is written, and 60 minutes until that page expires). But if the only other stream available writes one page every five minutes with a TTL of 15 minutes and selection logic 525 switched to that stream at time 0:45, it would take 120 minutes to fill block 103, plus another 15 minutes before the last data in block 103 expired. Thus, the average write size and average write arrival rate may impact the optimal time at which to change streams. Other schedules for using selection logic 525 may also be used, without limitation.

Figure 7:
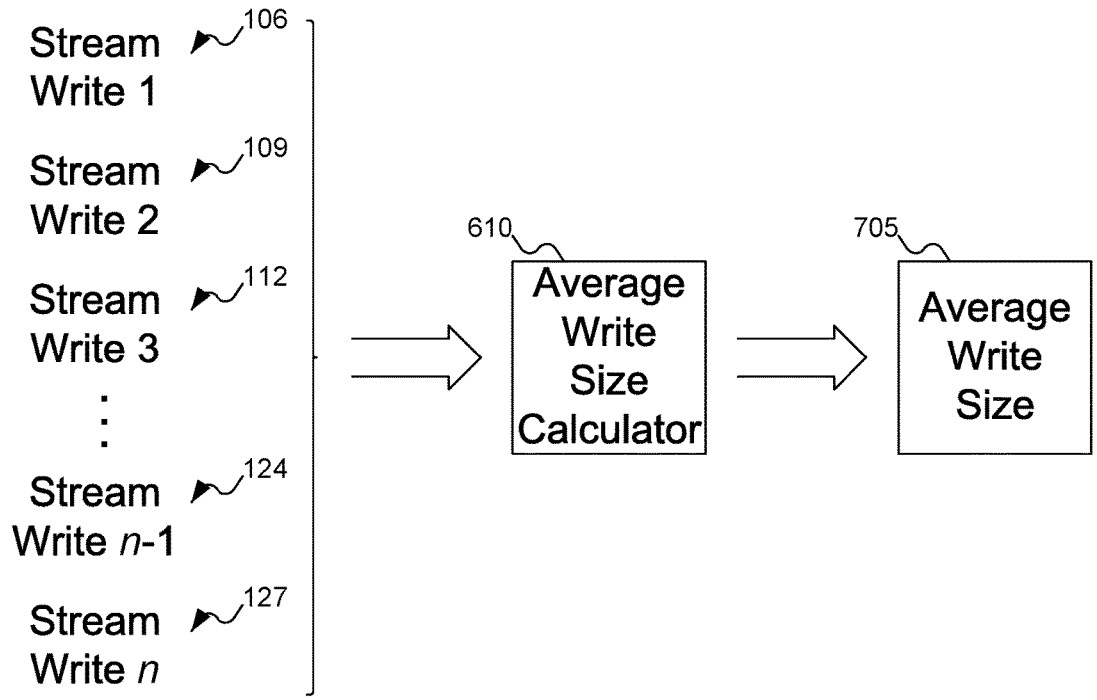
FIG. 7 show details of the average write size calculator of FIG. 6.

FIG. 7 shows details of average write size calculator 610 of FIG. 6. In FIG. 7, average write size calculator 610 may receive information about write operations 106, 109, 112, 124, and 127 for a given stream, and calculate average write size 705 for those writes (that is, the sum of the amount of data written, divided by the number of write operations performed). As described above, average write size calculator 610 may use all available information for the stream, or the most recent n write operations for the stream, or the earliest k of the last n write operations for the stream, or the write operations for the stream that occurred in the last t minutes, or any other desired approach to select write operations for the stream.

Figure 8:
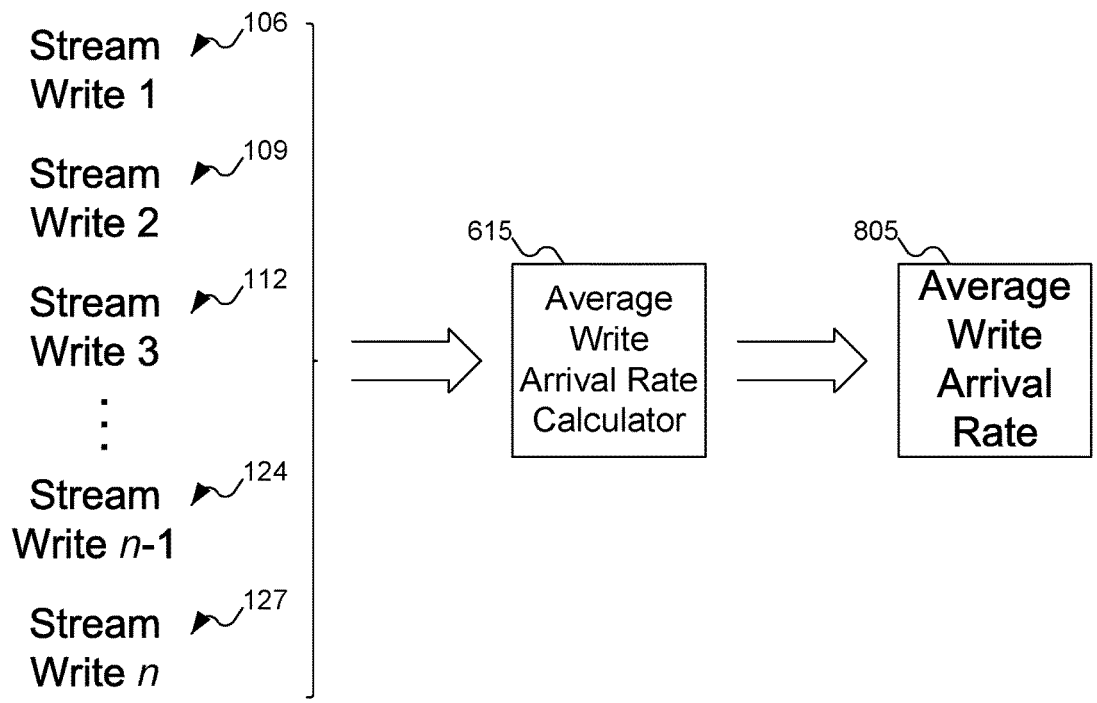
FIG. 8 show details of the average write arrival rate calculator of FIG. 6.

FIG. 8 show details of average write arrival rate calculator 615 of FIG. 6. In FIG. 8, average write arrival rate calculator 615 may receive information about write operations 106, 109, 112, 124, and 127 for a given stream, and calculate average write arrival rate 805 for those writes (that is, the amount of time between the first and last write operation, divided by the number of write operations performed in that interval). As described above, average write arrival rate calculator 615 may use all available information for the stream, or the most recent n write operations for the stream, or the earliest k of the last n write operations for the stream, or the write operations for the stream that occurred in the last t minutes, or any other desired approach to select write operations for the stream.

Figure 9:
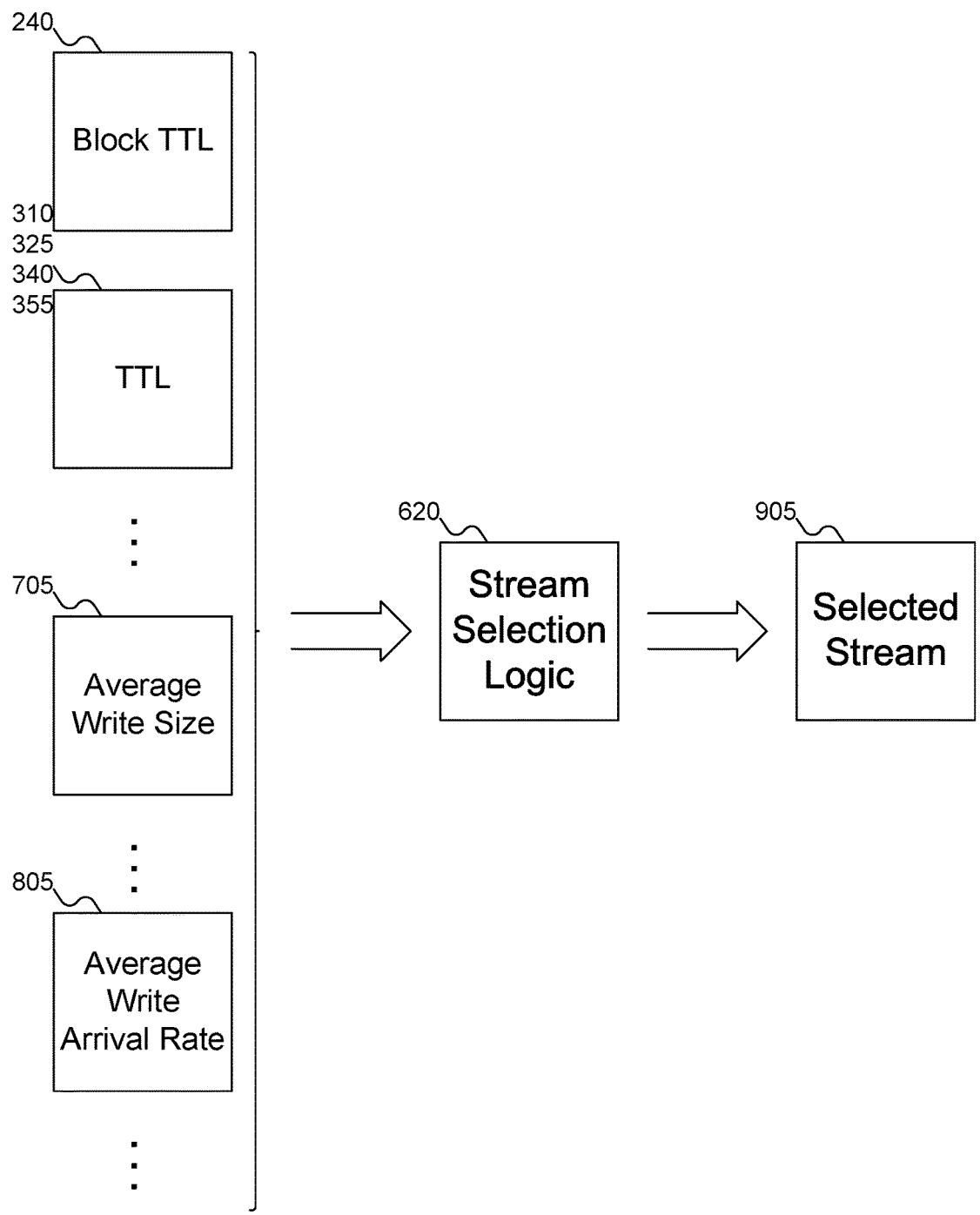
FIG. 9 shows details of the stream selection logic of FIG. 6.

FIG. 9 shows details of stream selection logic 620 of FIG. 6. In FIG. 9, stream selection logic 620 may receive various information, such as block TTL 240 of FIGS. 2A-3D, TTLs 245 and 250 of FIGS. 2A-2D from streams 205 and 210 of FIGS. 2A-2D, TTLs 310, 325, 340, and 355 of FIGS. 3A-3D from streams 305, 320, 335, and 350 of FIGS. 3A-3D, average write size 705 for each stream, and average write arrival rate 805 for each stream. Stream selection logic 620 may use this information to select stream 905 to write to block 103 of FIGS. 2B-3D. Stream selection logic 620 may use any desired strategy to select stream 905 to write to block 103 of FIGS. 2B-3D or to second order stream 405 of FIG. 4. For example, stream selection logic 620 may select a stream with the highest TTL less than the remaining TTL for block 240 of FIGS. 2A-3D. Or, stream selection logic 620 may calculate when to switch streams to optimize data expiration, as exemplified above with reference to FIGS. 2A-2D. Stream selection logic 620 may also use other selection strategies. As described above, stream selection logic 620 may use all of the provided information, or just some of it, to select stream 905. If, in an embodiment of the inventive concept, stream selection logic 620 does not use all of the information shown in FIG. 9, then stream selection logic 620 does not need to be provided all the information shown in FIG. 9.

Figure 10:
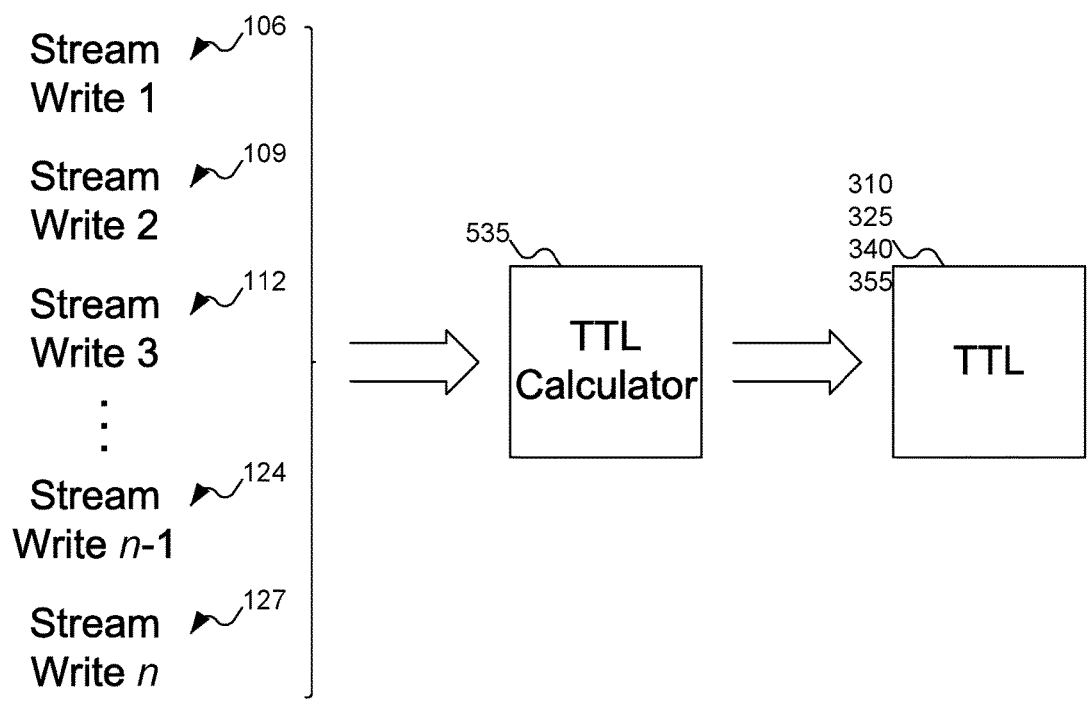
FIG. 10 show details of the TTL calculator of FIG. 5.

FIG. 10 show details of TTL calculator 535 of FIG. 5. In FIG. 10, TTL calculator 535 may receive information about write operations 106, 109, 112, 124, and 127 for a given stream, and calculate TTL 310, 325, 340, and 355 for those streams (that is, by measuring the time duration between when data is written and when that data is either modified or deleted, then summing those durations and dividing by the number of pages affected). As described above, TTL calculator 535 may use all available information for the stream, or the most recent n write operations for the stream, or the earliest k of the last n write operations for the stream, or the write operations for the stream that occurred in the last t minutes, or any other desired approach to select write operations for the stream.

Figure 11:
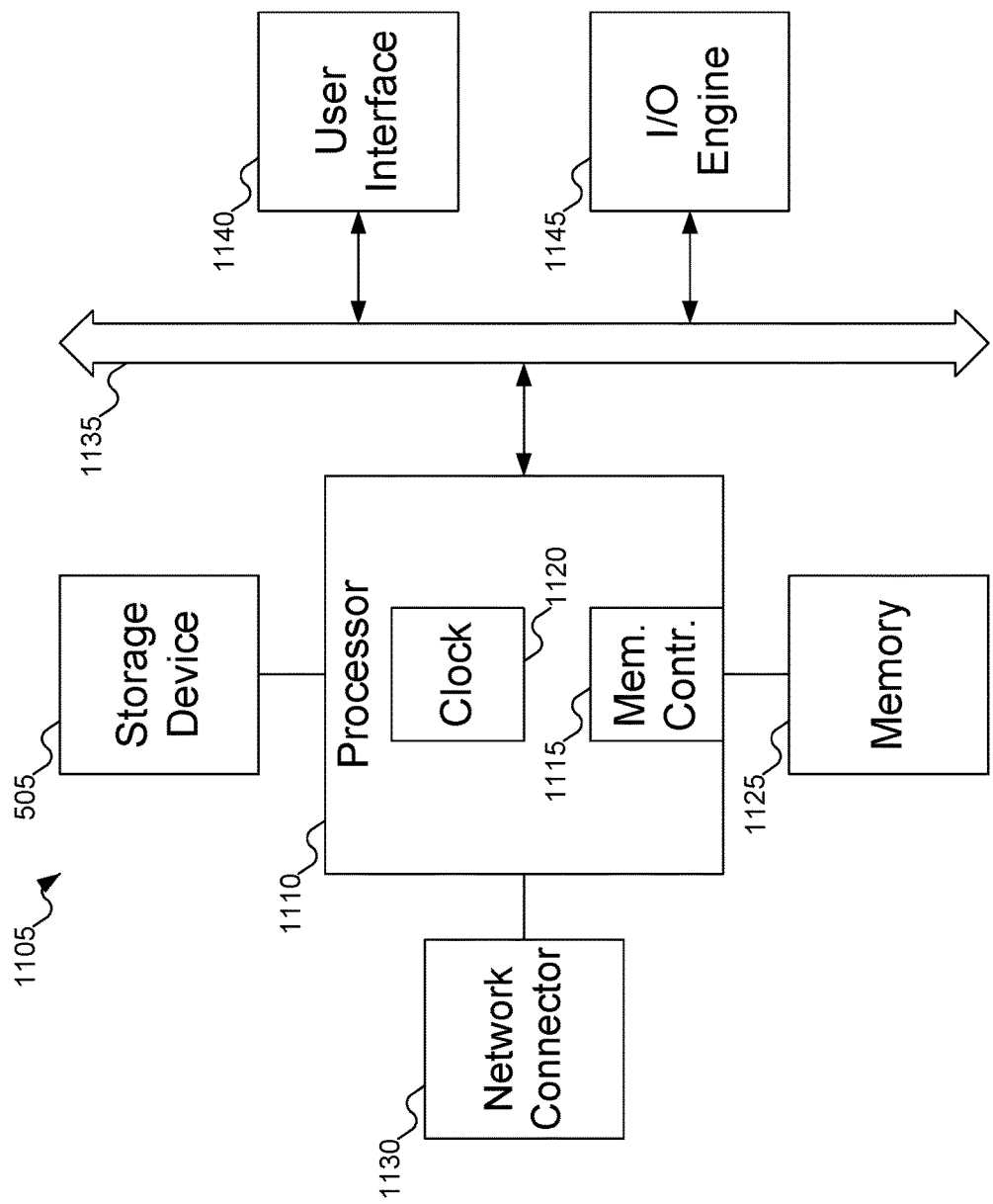
FIG. 11 shows details of a machine that may include the SSD of FIG. 5.

FIG. 11 shows details of a machine that may include the SSD of FIG. 5. Referring to FIG. 11, typically, machine or machines 1105 include one or more processors 1110, which may include memory controller 1115 and clock 1120, which may be used to coordinate the operations of the components of machine or machines 1105. Processors 1110 may also be coupled to memory 1125, which may include random access memory (RAM), read-only memory (ROM), or other state preserving media, as examples. Processors 1110 may also be coupled to storage devices 505 and network connector 1130, which may be, for example, an Ethernet connector. Processors 1110 may also be connected to a bus 1135, to which may be attached user interface 1140 and input/output interface ports that may be managed using input/output engine 1145, among other components.

Figure 12:
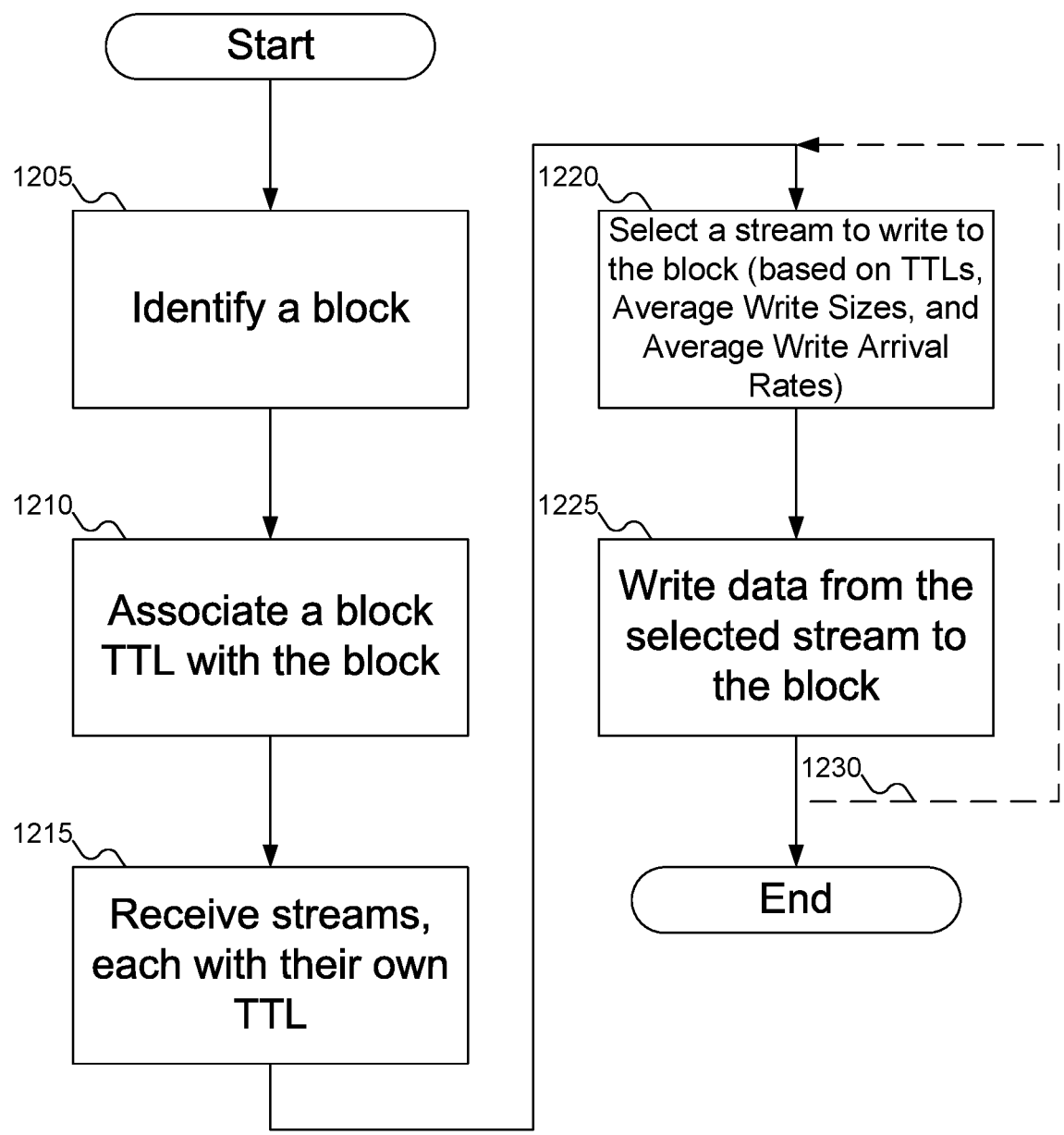
FIG. 12 shows a flowchart of a procedure for the SSD of FIG. 5 to write data from different streams to the block of FIG. 1, according to an embodiment of the inventive concept.

FIG. 12 shows a flowchart of a procedure for the SSD of FIG. 5 to write data from different streams to the block of FIG. 1, according to an embodiment of the inventive concept. In FIG. 12, at block 1205, SSD 505 of FIG. 5 may identify block 103 of FIG. 1. At block 1210, SSD 505 of FIG. 5 may associate TTL 240 of FIGS. 2A-3D with block 103 of FIG. 1. At block 1215, SSD 505 of FIG. 5 may receive streams 205 and 210 of FIGS. 2A-2D, and streams 305, 320, 335, and 350 of FIGS. 3A-3D. At block 1220, SSD 505 of FIG. 5 may select stream 905 to write to block 103 of FIG. 1. At block 1225, SSD 505 of FIG. 5 may write data from selected stream 905 to block 103 of FIG. 1. As shown by dashed line 1230, control may optionally return to block 1220 to enable SSD 505 of FIG. 5 to select a different stream to write to block 103 of FIG. 1 at a later time.

Figure 13:
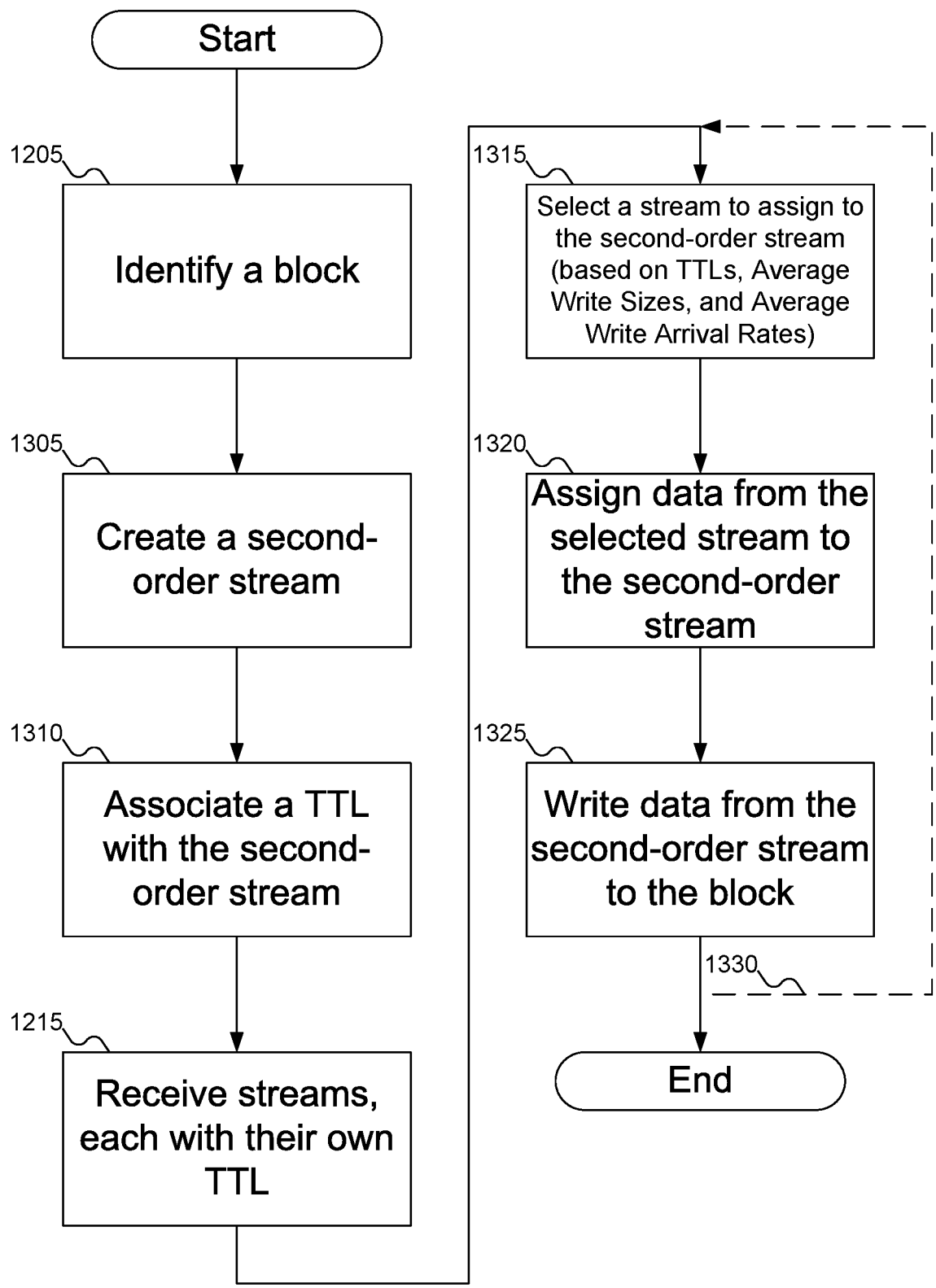
FIG. 13 shows a flowchart of a procedure for the SSD of FIG. 5 to write data from different streams to the block of FIG. 1 using a second-order stream, according to an embodiment of the inventive concept.

FIG. 13 shows a flowchart of a procedure for the SSD of FIG. 5 to write data from different streams to the block of FIG. 1 using a second-order stream, according to an embodiment of the inventive concept. In FIG. 13, at block 1205, SSD 505 of FIG. 5 may identify block 103 of FIG. 1. At block 1305, SSD 505 of FIG. 5 may create second-order stream 405 of FIG. 4. At block 1310, SSD 505 of FIG. 5 may assign TTL 410 of FIG. 4 to second-order stream 405 of FIG. 4. At block 1215, SSD 505 of FIG. 5 may receive streams 205 and 210 of FIGS. 2A-2D or streams 305, 320, 335, and 350 of FIGS. 3A-3D. At block 1315, SSD 505 of FIG. 5 may select stream 905 to write to second-order stream 405 of FIG. 4. At block 1320, SSD 505 of FIG. 5 may write data from selected stream 905 to second-order stream 405 of FIG. 4. At block 1325, SSD 505 of FIG. 5 may write data from second-order stream 405 of FIG. 4 to block 103 of FIG. 1. As shown by dashed line 1330, control may optionally return to block 1315 to enable SSD 505 of FIG. 5 to select a different stream to write to second-order stream 405 of FIG. 4 at a later time.

In FIGS. 12-13, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Solid State Drive (SSD) (505), comprising:

reception circuitry (510) to receive data from a first stream (305, 320, 335, 350) including a first Time-to-Live (TTL) (310, 325, 340, 355) and to receive data from a second stream (305, 320, 335, 350) including a second TTL (310, 325, 340, 355), the second TTL (310, 325, 340, 355) different from the first TTL (310, 325, 340, 355);

selection logic (525) to select which stream (305, 320, 335, 350) to write to a block (103) on the SSD (505) based on the first TTL (310, 325, 340, 355) and the second TTL (310, 325, 340, 355); and writing logic (530) to write data from both the first stream (305, 320, 335, 350) and the second stream (305, 320, 335, 350) to the block (103) on the SSD (505).

Statement 2. An embodiment of the inventive concept includes an SSD (505) according to statement 1, wherein all the data stored in the block (103) is expected to expire sooner than if only data from one of the first stream (305, 320, 335, 350) and the second stream (305, 320, 335, 350) were written to the block (103).

Statement 3. An embodiment of the inventive concept includes an SSD (505) according to statement 1, wherein the selection logic (525) is operative to select the first stream (305, 320, 335, 350) to write to the block (103) at a first time based on the first TTL (310, 325, 340, 355) and the second TTL (310, 325, 340, 355) and to select the second stream 305, 320, 335, 350) to write to the block (103) at a second time based on the first TTL (310, 325, 340, 355) and the second TTL (310, 325, 340, 355).

Statement 4. An embodiment of the inventive concept includes an SSD (505) according to statement 1, wherein the selection logic (525) is operative to periodically select which stream to write to a block (103) on the SSD (505) based on the first TTL (310, 325, 340, 355) and the second TTL (310, 325, 340, 355).

Statement 5. An embodiment of the inventive concept includes an SSD (505) according to statement 1, wherein the selection logic (525) is operative to select which stream to write to a block (103) on the SSD (505) based on the first TTL (310, 325, 340, 355) and the second TTL (310, 325, 340, 355) when the reception circuitry (510) receives data from either the first stream (305, 320, 335, 350) or the second stream (305, 320, 335, 350).

Statement 6. An embodiment of the inventive concept includes an SSD (505) according to statement 1, wherein the selection logic (525) includes a comparator (605) to compare the first TTL (310, 325, 340, 355) and the second TTL (310, 325, 340, 355) with a block TTL (240) associated with the block (103).

Statement 7. An embodiment of the inventive concept includes an SSD (505) according to statement 1, wherein the selection logic (525) includes:

an average write size calculator (610) to calculate a first average write size (705) for write operations (106, 109, 112, 124, 127) associated with the first stream (305, 320, 335, 350) and a second average write size (705) for write operations (106, 109, 112, 124, 127) associated with the second stream (305, 320, 335, 350); and an average write arrival rate calculator (615) to calculate a first average write arrival rate (805) for the first stream (305, 320, 335, 350) and a second average write arrival rate (805) for the second stream (305, 320, 335, 350).

Statement 8. An embodiment of the inventive concept includes an SSD (505) according to statement 7, wherein the selection logic (525) is operative to select which stream to write to a block (103) on the SSD (505) based on at least two of the first TTL (310, 325, 340, 355), the second TTL (310, 325, 340, 355), the first average write size (705), the first average write arrival rate (805), the second average write size (705), and the second average write arrival rate (805).

Statement 9. An embodiment of the inventive concept includes an SSD (505) according to statement 1, further comprising a TTL calculator (535) to calculate the first TTL (310, 325, 340, 355) for the first stream (305, 320, 335, 350) and the second TTL (310, 325, 340, 355) for the second stream (305, 320, 335, 350).

Statement 10. An embodiment of the inventive concept includes an SSD (505) according to statement 1, wherein:

the SSD (505) further comprises a second-order stream creator (540) to create a second-order stream (405), the second-order stream (405);

the selection logic (525) includes stream selection logic (620) to select which of the first stream (305, 320, 335, 350) and the second stream (305, 320, 335, 350) to write to the second-order stream (405); and the writing logic (530) is operative to write the second-order stream (405) to the block (103).

Statement 11. An embodiment of the inventive concept includes an SSD (505) according to statement 1, wherein:

the reception circuitry (510) is operative to receive data from the first stream (305, 320, 335, 350), the second stream (305, 320, 335, 350), and a third stream (305, 320, 335, 350) including a third TTL (310, 325, 340, 355), the third TTL (310, 325, 340, 355) different from the first TTL (310, 325, 340, 355) and the second TTL (310, 325, 340, 355);

the selection logic (525) is operative to select which stream to write to a block (103) on the SSD (505) based on the first TTL (310, 325, 340, 355), the second TTL (310, 325, 340, 355), and the third TTL (310, 325, 340, 355); and the writing logic (530) is operative to write data from the first stream (305, 320, 335, 350), the second stream (305, 320, 335, 350), and the third stream (305, 320, 335, 350) to the block (103) on the SSD (505).

Statement 12. An embodiment of the inventive concept includes a logic for a Solid State Drive (SSD) (505), comprising:

storage (625) for a block Time-to-Live (TTL) (240) for a block (103) on the SSD (505); and selection logic (525) to select between a first stream (305, 320, 335, 350) with a first TTL (310, 325, 340, 355) and a second stream (305, 320, 335, 350) with a second TTL (310, 325, 340, 355) to write to the block (103) based on the block TTL (240), the first TTL (310, 325, 340, 355), and the second TTL (310, 325, 340, 355).

Statement 13. An embodiment of the inventive concept includes a logic according to statement 12, wherein all the data stored in the block (103) is expected to expire sooner than if only data from one of the first stream (305, 320, 335, 350) and the second stream (305, 320, 335, 350) were written to the block (103).

Statement 14. An embodiment of the inventive concept includes a logic according to statement 12, wherein the selection logic (525) is operative to select the first stream (305, 320, 335, 350) to write to the block (103) at a first time based on the block TTL (240), the first TTL (310, 325, 340, 355), and the second TTL (310, 325, 340, 355) and to select the second stream (305, 320, 335, 350) to write to the block (103) at a second time based on the block TTL (240), the first TTL (310, 325, 340, 355), and the second TTL (310, 325, 340, 355).

Statement 15. An embodiment of the inventive concept includes a logic according to statement 12, wherein the selection logic (525) is operative to periodically select which stream to write to a block (103) on the SSD (505) based on the block TTL (240), the first TTL (310, 325, 340, 355), and the second TTL (310, 325, 340, 355).

Statement 16. An embodiment of the inventive concept includes a logic according to statement 12, wherein the selection logic (525) is operative to select which stream to write to a block (103) on the SSD (505) based on the block TTL (240), the first TTL (310, 325, 340, 355), and the second TTL (310, 325, 340, 355) when the SSD (505) receives data from either the first stream (305, 320, 335, 350) or the second stream (305, 320, 335, 350).

Statement 17. An embodiment of the inventive concept includes a logic according to statement 12, wherein the selection logic (525) includes a comparator (605) to compare the first TTL (310, 325, 340, 355) and the second TTL (310, 325, 340, 355) with the block TTL (240).

Statement 18. An embodiment of the inventive concept includes a logic according to statement 12, wherein the selection logic (525) includes:

an average write size calculator (610) to calculate a first average write size (705) for write operations (106, 109, 112, 124, 127) associated with the first stream (305, 320, 335, 350) and a second average write size (705) for write operations (106, 109, 112, 124, 127) associated with the second stream (305, 320, 335, 350); and an average write arrival rate calculator (615) to calculate a first average write arrival rate (805) for the first stream (305, 320, 335, 350) and a second average write arrival rate (805) for the second stream (305, 320, 335, 350).

Statement 19. An embodiment of the inventive concept includes a logic according to statement 18, wherein the selection logic (525) is operative to select which stream to write to a block (103) on the SSD (505) based on at least two of the block TTL (240), the first TTL (310, 325, 340, 355), the second TTL (310, 325, 340, 355), the first average write size (705), the first average write arrival rate, the second average write size (705), and the second average write arrival rate.

Statement 20. An embodiment of the inventive concept includes a logic according to statement 12, further comprising a TTL calculator (535) to calculate the first TTL (310, 325, 340, 355) for the first stream (305, 320, 335, 350) and the second TTL (310, 325, 340, 355) for the second stream (305, 320, 335, 350).

Statement 21. An embodiment of the inventive concept includes a logic according to statement 12, wherein:

the logic further comprises a second-order stream creator (540) to create a second-order stream (405); and the selection logic (525) includes stream selection logic (620) to select which of the first stream (305, 320, 335, 350) and the second stream (305, 320, 335, 350) to write to the second-order stream (405), wherein the second-order stream (405) may be written to the block (103).

Statement 22. An embodiment of the inventive concept includes a logic according to statement 12, wherein the selection logic (525) is operative to select between the first stream (305, 320, 335, 350) with the first TTL (310, 325, 340, 355), the second stream (305, 320, 335, 350) with the second TTL (310, 325, 340, 355), and a third stream (305, 320, 335, 350) with a third TTL (310, 325, 340, 355) to write to the block (103) based on the block TTL (240), the first TTL (310, 325, 340, 355), the second TTL (310, 325, 340, 355), and the third TTL (310, 325, 340, 355).

Statement 23. An embodiment of the inventive concept includes a method, comprising:

identifying (1205) a block (103) on a Solid State Drive (SSD) (505);

receiving (1215) a first stream (305, 320, 335, 350), the first stream (305, 320, 335, 350) including a first Time-To-Live (TTL) (310, 325, 340, 355);

receiving (1215) a second stream (305, 320, 335, 350), the second stream (305, 320, 335, 350) including a second TTL (310, 325, 340, 355), the second TTL (310, 325, 340, 355) different from the first TTL (310, 325, 340, 355);

selecting (1220) whether to write the first stream (305, 320, 335, 350) or the second stream (305, 320, 335, 350) to the block (103) based on the first TTL (310, 325, 340, 355) and the second TTL (310, 325, 340, 355); and writing (1225) data from both the first stream (305, 320, 335, 350) and the second stream (305, 320, 335, 350) to the block (103).

Statement 24. An embodiment of the inventive concept includes a method according to statement 23, wherein all the data stored in the block (103) is expected to expire sooner than if only data from one of the first stream (305, 320, 335, 350) and the second stream (305, 320, 335, 350) were written to the block (103).

Statement 25. An embodiment of the inventive concept includes a method according to statement 23, wherein selecting (1220) whether to write the first stream (305, 320, 335, 350) or the second stream (305, 320, 335, 350) to the block (103) includes:

selecting (1220) to write the first stream (305, 320, 335, 350) to the block (103) at a first time based on the first TTL (310, 325, 340, 355) and the second TTL (310, 325, 340, 355); and selecting (1220) to write the second stream (305, 320, 335, 350) to the block (103) at a second time based on the first TTL (310, 325, 340, 355) and the second TTL (310, 325, 340, 355).

Statement 26. An embodiment of the inventive concept includes a method according to statement 23, wherein selecting (1220) whether to write the first stream (305, 320, 335, 350) or the second stream (305, 320, 335, 350) to the block (103) includes periodically selecting (1220) whether to write the first stream (305, 320, 335, 350) or the second stream (305, 320, 335, 350) to the block (103) based on the first TTL (310, 325, 340, 355) and the second TTL (310, 325, 340, 355).

Statement 27. An embodiment of the inventive concept includes a method according to statement 23, wherein selecting (1220) whether to write the first stream (305, 320, 335, 350) or the second stream (305, 320, 335, 350) to the block (103) includes selecting (1220) whether to write the first stream (305, 320, 335, 350) or the second stream (305, 320, 335, 350) to the block (103) based on the first TTL (310, 325, 340, 355) and the second TTL (310, 325, 340, 355) whenever data from either the first stream (305, 320, 335, 350) or the second stream (305, 320, 335, 350) is written to the SSD (505).

Statement 28. An embodiment of the inventive concept includes a method according to statement 23, wherein:

selecting (1220) whether to write the first stream (305, 320, 335, 350) or the second stream (305, 320, 335, 350) to the block (103) includes selecting (1220) whether to write the first stream (305, 320, 335, 350) or the second stream (305, 320, 335, 350) to the block (103) based on at least two of the first TTL (310, 325, 340, 355), the second TTL (310, 325, 340, 355), a first average write size (705) for the first stream (305, 320, 335, 350), a second average write size (705) for the second stream (305, 320, 335, 350), a first average write arrival rate (805) for the first stream (305, 320, 335, 350), and a second average write arrival rate (805) for the second stream (305, 320, 335, 350).

Statement 29. An embodiment of the inventive concept includes a method according to statement 23, wherein identifying (1205) a block (103) on a Solid State Drive (SSD) (505) includes associating (1210) a block TTL (240) with the block (103).

Statement 30. An embodiment of the inventive concept includes a method according to statement 29, wherein selecting (1220) whether to write the first stream (305, 320, 335, 350) or the second stream (305, 320, 335, 350) to the block (103) includes selecting (1220) whether to write the first stream (305, 320, 335, 350) or the second stream (305, 320, 335, 350) to the block (103) based on the first TTL (310, 325, 340, 355), the second TTL (310, 325, 340, 355), and the block TTL (240).

Statement 31. An embodiment of the inventive concept includes a method according to statement 30, wherein selecting (1220) whether to write the first stream (305, 320, 335, 350) or the second stream (305, 320, 335, 350) to the block (103) further includes selecting (1220) whether to write the first stream (305, 320, 335, 350) or the second stream (305, 320, 335, 350) based on whether the first TTL (310, 325, 340, 355) or the second TTL (310, 325, 340, 355) is closer to the block TTL (240).

Statement 32. An embodiment of the inventive concept includes a method according to statement 23, wherein:

the method further comprises:

establishing (1305) a second-order stream (405); and associating (1310) the second order stream with the block (103); and selecting (1220) whether to write the first stream (305, 320, 335, 350) or the second stream (305, 320, 335, 350) to the block (103) includes selecting (1325) whether to assign data from the first stream (305, 320, 335, 350) or the second stream (305, 320, 335, 350) to the second-order stream (405).

Statement 33. An embodiment of the inventive concept includes a method according to statement 23, wherein:

the method further comprises receiving (1215) a third stream (305, 320, 335, 350), the third stream (305, 320, 335, 350) including a third TTL (310, 325, 340, 355), the third TTL (310, 325, 340, 355) different from the first TTL (310, 325, 340, 355) and the second TTL (310, 325, 340, 355);

selecting (1220) whether to write the first stream (305, 320, 335, 350) or the second stream (305, 320, 335, 350) to the block (103) includes selecting (1220) whether to write the first stream (305, 320, 335, 350), the second stream (305, 320, 335, 350), or the third stream (305, 320, 335, 350) to the block (103) based on the first TTL (310, 325, 340, 355), the second TTL (310, 325, 340, 355), and the third TTL (310, 325, 340, 355); and writing (1225) data from both the first stream (305, 320, 335, 350) and the second stream (305, 320, 335, 350) to the block (103) includes writing (1225) data from the first stream (305, 320, 335, 350), the second stream (305, 320, 335, 350), and the third stream (305, 320, 335, 350) to the block (103).

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A Solid State Drive (SSD), comprising:
reception circuitry to receive data from a first stream including a first Time-to-Live (TTL) and to receive data from a second stream including a second TTL, the second TTL different from the first TTL;
selection logic to select to write data from the first stream to a block on the SSD at a first time based on the first TTL and to select to write data from the second stream to the block on the SSD at a second time based on the second TTL; and
writing logic to write data from the first stream to a first page in the block on the SSD and to write data from the second stream to a second page in the block on the SSD,
wherein data from the first stream and the second stream are both written to the block before the block is subject to garbage collection.

2. An SSD according to claim 1, wherein all the data stored in the block is expected to expire sooner than if only data from one of the first stream and the second stream were written to the block.

3. An SSD according to claim 1, wherein the selection logic includes:
an average write size calculator to calculate a first average write size for write operations associated with the first stream and a second average write size for write operations associated with the second stream; and
an average write arrival rate calculator to calculate a first average write arrival rate for the first stream and a second average write arrival rate for the second stream.

4. An SSD according to claim 3, wherein the selection logic is operative to select which stream to write to a block on the SSD based on at least two of the first TTL, the second TTL, the first average write size, the first average write arrival rate, the second average write size, and the second average write arrival rate.

5. An SSD according to claim 1, wherein:
the SSD further comprises a second-order stream creator to create a second-order stream;
the selection logic includes stream selection logic to select which of the first stream and the second stream to write to the second-order stream; and
the writing logic is operative to write the second-order stream to the block.

6. A Solid State Drive (SSD) controller for an SSD, comprising:
storage for a block Time-to-Live (TTL) for a block on the SSD; and
selection logic to select between a first stream with a first TTL and a second stream with a second TTL to write to the block based on the block TTL, the first TTL, and the second TTL,
wherein data from the first stream and the second stream are both written to the block before the block is subject to garbage collection.

7. An SSD controller according to claim 6, wherein all the data stored in the block is expected to expire sooner than if only data from one of the first stream and the second stream were written to the block.

8. An SSD controller according to claim 6, wherein the selection logic is operative to select the first stream to write to the block at a first time based on the block TTL, the first TTL, and the second TTL and to select the second stream to write to the block at a second time based on the block TTL, the first TTL, and the second TTL.

9. An SSD controller according to claim 6, wherein the selection logic includes:
an average write size calculator to calculate a first average write size for write operations associated with the first stream and a second average write size for write operations associated with the second stream; and
an average write arrival rate calculator to calculate a first average write arrival rate for the first stream and a second average write arrival rate for the second stream.

10. An SSD controller according to claim 9, wherein the selection logic is operative to select which stream to write to a block on the SSD based on at least two of the block TTL, the first TTL, the second TTL, the first average write size, the first average write arrival rate, the second average write size, and the second average write arrival rate.

11. An SSD controller according to claim 6, wherein the selection logic is operative to select between the first stream with the first TTL, the second stream with the second TTL, and a third stream with a third TTL to write to the block based on the block TTL, the first TTL, the second TTL, and the third TTL.

12. An SSD controller according to claim 6, wherein:
the logic further comprises a second-order stream creator to create a second-order stream; and
the selection logic includes stream selection logic to select which of the first stream and the second stream to write to the second-order stream,
wherein the second-order stream may be written to the block.

13. A method, comprising:
identifying a block on a Solid State Drive (SSD);
receiving a first stream, the first stream including a first Time-To-Live (TTL);

receiving a second stream, the second stream including a second TTL, the second TTL different from the first TTL;

selecting to write the first stream to the block at a first time based on the first TTL;

selecting to write the second stream to the block at a second time based the second TTL; and writing data from the first stream to a first page in the block and to write data from the second stream to a second page in the block, wherein data from the first stream and the second stream are both written to the block before the block is subject to garbage collection.

14. A method according to claim 13, wherein all the data stored in the block is expected to expire sooner than if only data from one of the first stream and the second stream were written to the block.

15. A method according to claim 13, wherein:
selecting whether to write the first stream or the second stream to the block includes selecting whether to write the first stream or the second stream to the block based on at least two of the first TTL, the second TTL, a first average write size for the first stream, a second average write size for the second stream, a first average write arrival rate for the first stream, and a second average write arrival rate for the second stream.

16. A method according to claim 13, wherein identifying a block on a Solid State Drive (SSD) includes associating a block TTL with the block.

17. A method according to claim 16, wherein selecting whether to write the first stream or the second stream to the block includes selecting whether to write the first stream or the second stream to the block based on the first TTL, the second TTL, and the block TTL.

18. A method according to claim 17, wherein selecting whether to write the first stream or the second stream to the block further includes selecting whether to write the first stream or the second stream based on whether the first TTL or the second TTL is closer to the block TTL.

19. A method according to claim 13, wherein:
the method further comprises:
establishing a second-order stream; and
associating the second order stream with the block; and
selecting whether to write the first stream or the second stream to the block includes selecting whether to assign data from the first stream or the second stream to the second-order stream.

20. A method according to claim 13, wherein:
the method further comprises receiving a third stream, the third stream including a third TTL, the third TTL different from the first TTL and the second TTL;
selecting whether to write the first stream or the second stream to the block includes selecting whether to write the first stream, the second stream, or the third stream to the block based on the first TTL, the second TTL, and the third TTL; and
writing data from both the first stream and the second stream to the block includes writing data from the first stream, the second stream, and the third stream to the block.

21. A method according to claim 18, wherein:
selecting whether to write the first stream or the second stream to the block further includes changing the block TTL to an updated block TTL to reflect a current state of the block; and
selecting whether to write the first stream or the second stream based on whether the first TTL or the second TTL is closer to the block TTL includes selecting whether to write the first stream or the second stream based on whether the first TTL or the second TTL is closer to the updated block TTL.

* * * * *